us007228201B2

(12) United States Patent  
Sabe et al.

(10) Patent No.: US 7,228,201 B2  
(45) Date of Patent: Jun. 5, 2007

(54) INFORMATION PROCESSING DEVICE, INFORMATION PROCESSING METHOD, AND ROBOT APPARATUS

(75) Inventors: Kohtaro Sabe, Tokyo (JP); Kenta Kawamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 1054 days.

(21) Appl. No.: 10/110,497

(22) PCT Filed: Aug. 16, 2001

(86) PCT No.: PCT/JP01/07067

§ 371 (c)(1),  
(2), (4) Date: Aug. 9, 2002

(87) PCT Pub. No.: WO02/15009

PCT Pub. Date: Feb. 21, 2002

(65) Prior Publication Data

US 2003/0040839 A1    Feb. 27, 2003

(30) Foreign Application Priority Data

Aug. 16, 2000 (JP) .............................. 2000-247021

(51) Int. Cl.  
*G06F 19/00* (2006.01)

(52) U.S. Cl. ..................... 700/245; 700/247; 700/249; 700/258; 318/568.1; 318/568.11; 318/568.12; 318/568.2; 318/569; 901/1; 901/15; 901/47

(58) Field of Classification Search ................ 700/200, 700/245, 700; 709/228, 231  
See application file for complete search history.

(56) References Cited

U.S. PATENT DOCUMENTS 6,289,382 B1* 9/2001 Bowman-Amuah ......... 709/226

| 6,477,580 | B1* | 11/2002 | Bowman-Amuah | 709/231 |
| 6,606,660 | B1* | 8/2003 | Bowman-Amuah | 709/227 |
| 6,615,253 | B1* | 9/2003 | Bowman-Amuah | 709/219 |
| 6,640,249 | B1* | 10/2003 | Bowman-Amuah | 709/228 |
| 2003/0058277 | A1* | 3/2003 | Bowman-Amuah | 345/765 |
| 2005/0235210 | A1* | 10/2005 | Peskin et al. | 715/716 |

FOREIGN PATENT DOCUMENTS

JP      11-120009     4/1999  
JP      P2000-148577  5/2000

OTHER PUBLICATIONS

Ammann, DIPC—A Monitor for Distributed Inter-Process Communication, 1995, Internet/IEEE, 272-279.*  
Rammkutty, Inter-Process Communication—Part 1, 2004, Internet, p. 1-11.*

(Continued)

*Primary Examiner*—Thomas Black  
*Assistant Examiner*—McDieunel Marc  
(74) *Attorney, Agent, or Firm*—Frommer Lawrence & Haug LLP; William S. Frommer; Thomas F. Presson

(57) ABSTRACT

A robot device (1) has a central processing process (CPU) having a plurality of objects and adapted for carrying out control processing on the basis inter-object communication carried out between the objects, the central processing process controlling accesses by the plurality of objects to a shared memory shared by the plurality of objects and thus carrying out inter-object communication. Specifically, the central processing process generates pointers P11, P12, P13, P21, P22 in accordance with accesses by the objects to predetermined areas M1, M2 on a shared memory M, then measures the pointers by the corresponding number-of-reference measuring objects RO1, RO2, and controls the accesses in accordance with the number of pointers measured, thereby carrying out inter-object communication. This enables easy realization of smooth inter-process communication.

12 Claims, 26 Drawing Sheets

OTHER PUBLICATIONS

WIKIPEDIA, Inter-Process Communication, 2006, Internet, p. 1-3.*

Tanaka, et al., "Message Communication Facilities for Distributed Real-Time Systems Based on Concurrent Object-Oriented Paradigm," vol. J78-D-1, No. 8, Aug. 25, 1995, pp. 736-745.

Inui, et al., "Bunsan OS Machga Wakaru Hon," 1st Edition, Tokyo, Nikkan Kogyo Shinbunsha, Oct. 30, 1992, pp. 36-37.

Sakamoto, et al., "UNIX Kernel no Sekkei," 1st Edition, Tokyo, Kyoritsu Shuppan K.K., Jun. 10, 1991, pp. 257-259, 310-314.

* cited by examiner

| INPUT \ STATE | Sleep | Rest | Wakeup | Move |
|---|---|---|---|---|
| NOTHING IS DETECTED FOR ONE MINUTE | Sleep | Sleep | Rest | Wakeup |
| RED, SIZE < 10 CONTINUED FOR 10 SECONDS OR MORE | Rest | Wakeup | Move | Move |
| RED, SIZE >= 10 | Wakeup | Move | Move | Move |

```
DRX-4Legged {
      DRX Head ;
      DRX RightFrontLeg ;
      DRX LeftFrontLeg ;
      DRX RightRearLeg ;
      DRX LeftRearLeg ;
}
DRX Wheel {
      DRX Head ;
      DRX RightFrontLeg ;
      DRX LeftFrontLeg ;
      DRX RightRearWheel ;
      DRX LeftRearWheel ;
}
DRX Head {
      DRX CameraLink ;
}
Virtual CameraLink {
      DRX CameraLink ;
      Camera ;
      Coordinate : /
}
DRX RightFrontLeg {
      Coordinate : /C1/C0-Joint ;
      Coordinate : /C1/C0/C0-Joint ;
      Coordinate : /C1/C0/C0/C0-Joint ;
      Coordinate : /C1/C0/C0/C0/C0-TouchSensor :
}
DRX LeftFrontLeg {
      Coordinate : /C2/C0-Joint ;
      Coordinate : /C2/C0/C0-Joint ;
      Coordinate : /C2/C0/C0/C0-Joint ;
      Coordinate : /C2/C0/C0/C0/C0-TouchSensor :
}
DRX RightRearLeg {
      Coordinate : /C3/C0-Joint ;
      Coordinate : /C3/C0/C0-Joint ;
      Coordinate : /C3/C0/C0/C0-Joint ;
      Coordinate : /C3/C0/C0/C0/C0-TouchSensor :
}
DRX LeftRearLeg {
      Coordinate : /C4/C0-Joint ;
      Coordinate : /C4/C0/C0-Joint ;
      Coordinate : /C4/C0/C0/C0-Joint ;
      Coordinate : /C4/C0/C0/C0/C0-TouchSensor :
}
DRX RightRearWheel {
      Coordinate : /C3/C0-Wheel ;
}
DRX LeftRearWheel {
      Coordinate : /C4/C0-Wheel ;
}
```

FIG.8

CPC Current Information {
    Coordinate : /C0/C0-Joint ;
    Coordinate : /C0/C0/C0-Joint ;
    Coordinate : /C0/C0/C0/C0-Joint ;
    Coordinate : /C0/C0/C0/C0/C0-Camera ;
    Coordinate : /C1/C0-Joint ;
    Coordinate : /C1/C0/C0-Joint ;
    Coordinate : /C1/C0/C0/C0-Joint ;
    Coordinate : /C1/C0/C0/C0/C0-TouchSensor :
    Coordinate : /C2/C0-Joint ;
    Coordinate : /C2/C0/C0-Joint ;
    Coordinate : /C2/C0/C0/C0-Joint ;
    Coordinate : /C2/C0/C0/C0/C0-TouchSensor :
    Coordinate : /C3/C0-Joint ;
    Coordinate : /C3/C0/C0-Joint ;
    Coordinate : /C3/C0/C0/C0-Joint ;
    Coordinate : /C3/C0/C0/C0/C0-TouchSensor :
    Coordinate : /C4/C0-Joint ;
    Coordinate : /C4/C0/C0-Joint ;
    Coordinate : /C4/C0/C0/C0-Joint ;
    Coordinate : /C4/C0/C0/C0/C0-TouchSensor :
}

FIG.9

INFORMATION PROCESSING DEVICE, INFORMATION PROCESSING METHOD, AND ROBOT APPARATUS

TECHNICAL FIELD

This invention relates to an information processing device and an information processing method for carrying out various processing using a plurality of processes, and a robot device which has its motion or the like determined by a plurality of processes.

BACKGROUND ART

In the case of carrying out communication (inter-process communication) between a plurality of distributed processes for executing tasks in real time, the proceeding status of the task is different depending on the weight, priority, processing cycle and the like of the processing of each process. For example, if the processing result (data) of a process A which is executed at a high speed is transmitted from the process A to a process B which is executed at a low speed, the process B is filled with the received queues from the process A and the received queues overflow. Such a problem of overflowing queues occurs at various sites in a system operating in real time. In order to prevent this problem, handshaking between the processes must be carried out by a certain technique. For example, the following three techniques are proposed (Basics and Application of OS, A. S. Tannenbaum, Toppan, p.464):

(1) blocking transmission;
(2) non-blocking transmission which involves copying; and
(3) non-blocking transmission which involves interrupt.

These three techniques (1) to (3) are proposed. The blocking transmission (1) is a transmission technique in which The transmitting side waits until transmission is completed and the queues at destination are emptied. The non-blocking transmission which involves copying (2) is a transmission technique in which data is copied into an area of the system so as to let the process on the transmitting side proceed. The non-blocking transmission which involves interrupt (3) is a transmission technique in which writing to a transmission buffer is carried out by interrupt processing.

Meanwhile, though it can be said that the above-described blocking transmission (1) is a safe and secure transmission technique, this technique is not practical because when freely changing the connection of software or process as a component (for example, object-oriented software, hereinafter referred to as object), a deadlock may easily occur depending on the way of connection.

Object-oriented software is constituted, for example, in a pet-like robot device or the like. A pet-like robot device makes, for example, gestures similar to those of a certain animal in accordance with various processing (for example, data communication) through inter-object communication (or inter-process communication).

The above-described non-blocking transmission which involves copying (2) is less efficient because it repeats redundant copying. For example, in inter-object communication where communications (or connections) between a plurality of objects and a plurality of objects are permitted, an increase in the number of connections causes an increase in the number of times of copying and hence the number of memories used as buffers.

In the above-described non-blocking transmission which involves interrupt (3), no redundant copying from the transmission buffer is carried out, thus saving the time for carrying out the subsequent processing. However, since the interrupt notifies the user of the information that the transmission buffer has been made writable again, it becomes more difficult for the user to handle the programming. Therefore, the non-blocking transmission which involves interrupt (3) is considered to have more problems than advantages.

Thus, it is desired to realize the elimination of redundant copying from the transmission buffer as in the non-blocking transmission which involves interrupt (3) while solving the problems of this technique so that the user will not feel the handling troublesome.

DISCLOSURE OF THE INVENTION

Thus, in view of the foregoing status of the art, it is an object of the present invention to provide an information processing device, an information processing method, and a robot device which can easily realize smooth inter-process communication.

An information processing device according to the present invention comprises control means having a plurality of information processing processes and adapted for carrying out control processing based on inter-process communication carried out between the information processing processes, the control means controlling accesses by the plurality of information processing processes to a shared memory shared by the plurality of information processing processes and thus carrying out inter-process communication.

In the information processing device having such a structure, the information processing processes, each of which independently executes processing, share data on the shared memory and thus execute various processing.

An information processing method according to the present invention has a plurality of information processing processes and is adapted for carrying out control processing based on inter-process communication carried out between the information processing processes, the information processing method comprising controlling accesses by the plurality of information processing processes to a shared memory shared by the plurality of information processing processes and thus carrying out inter-process communication.

In such an information processing method, the information processing processes, each of which independently executes processing, share data on the shared memory and thus execute various processing.

A robot device according to the present invention comprises output means for expressing a motion, and control means having a plurality of information processing processes and adapted for carrying out control processing of the output means based on inter-process communication carried out between the information processing processes, the control means controlling accesses by the plurality of information processing processes to a shared memory shared by the plurality of information processing processes and thus carrying out inter-process communication.

In the robot device having such a structure, the information processing processes, each of which independently executes processing, share data on the shared memory and thus execute the control processing of the output means.

That is, in the information processing device according to the present invention, as control means having a plurality of information processing processes and adapted for carrying out control processing based on inter-process communication carried out between the information processing processes controls accesses by the plurality of information processing processes to a shared memory shared by the plurality of information processing processes and thus carries out inter-process communication, the information processing processes, each of which independently executes processing, can share data on the shared memory and thus execute the various processing.

Morever, in the information processing method according to the present invention, as a plurality of information processing processes are provided, then control processing is carried out based on inter-process communication carried out between the information processing processes, then accesses by the plurality of information processing processes to a shared memory shared by the plurality of information processing processes are controlled to carry out inter-process communication, the information processing processes, each of which independently executes processing, can share data on the shared memory and thus execute the various processing.

Furthermore, in the robot device according to the present invention, as control means having a plurality of information processing processes and adapted for carrying out control processing of output means based on inter-process communication carried out between the information processing processes controls accesses by the plurality of information processing processes to a shared memory shared by the plurality of information processing processes and thus carries out inter-process communication, the information processing processes, each of which independently executes processing, can share data on the shared memory and thus execute the control processing of the output means.

BRIEF DESCRIPTION OF THE DRAWINGS

FIG. 8 is a chart showing the description of a design file.

FIG. 9 is a chart showing connection information.

BEST MODE FOR CARRYING OUT THE INVENTION

An embodiment of the present invention will now be described in detail with reference to the drawings. In this embodiment, the present invention is applied to a pet-like robot device in which object-oriented software is constructed. The pet-like robot device makes, for example, gestures similar to those of a certain animal in accordance with various processing (for example, data communication) through inter-object communication (or inter-process communication). It should be noted that this invention is not limited to the pet-like robot device and can be applied to other devices within the scope of this invention. The structure of the robot device will be first described and then essential parts of this invention will be described in detail.

STRUCTURE OF EMBODIMENT (1-1) Overall Structure

Figure 1:
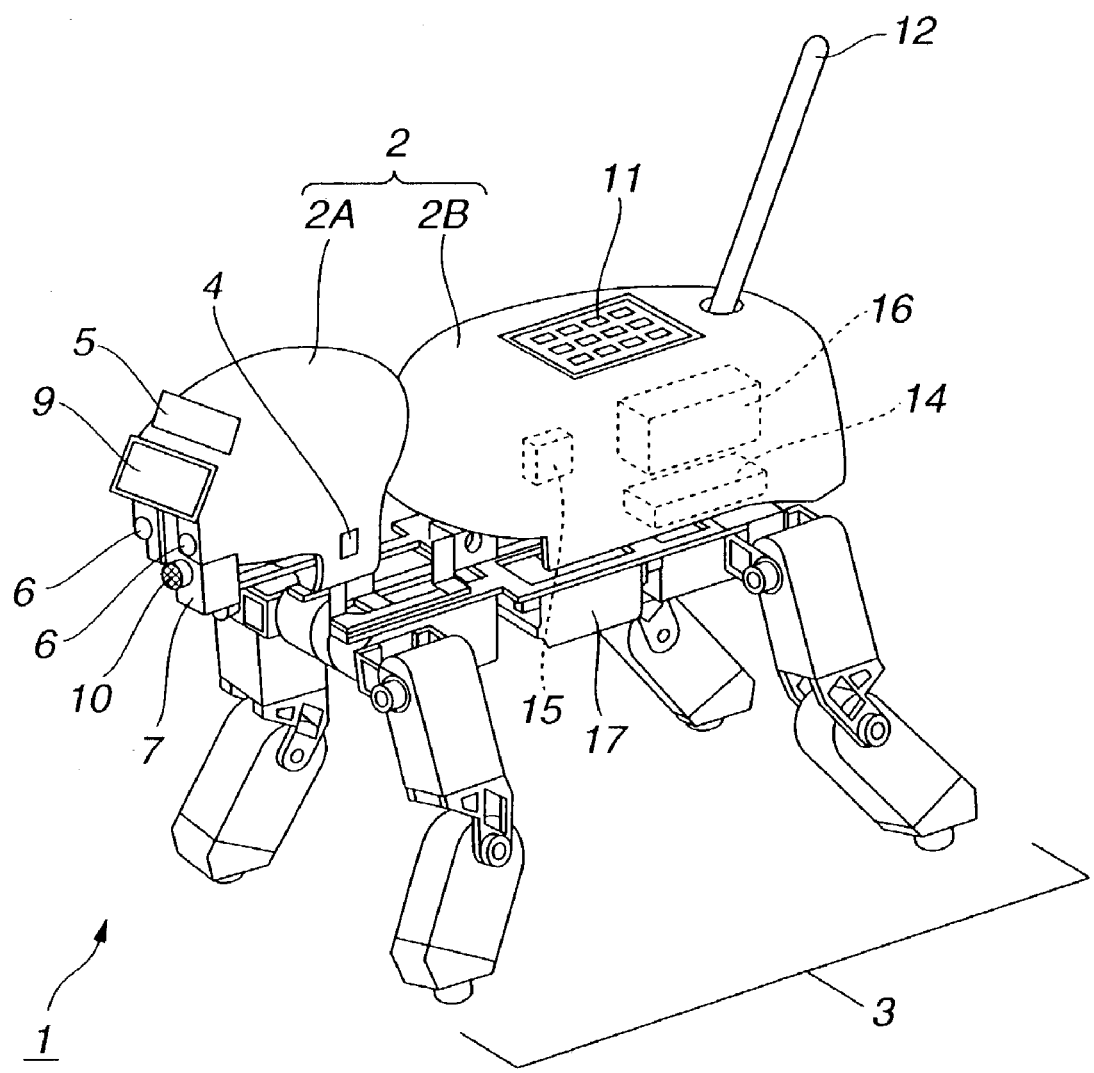
FIG. 1 is a perspective view showing the structure of a robot device according to an embodiment of the present invention.

A robot device 1 is a so-called pet-like robot device which has a dog-like shape as a whole and can walk with four legs, as shown in FIG. 1. That is, the robot device 1 includes a moving unit 3 mounted on a body 2, and the body 2 is constituted by a head part 2A and a trunk part 2B.

The head part 2A has arranged thereon a microphone 4, a touch sensor 5, a television camera 6 capable of realizing stereoscopic vision, a remote-controlled infrared receiving portion 7 and the like, and can acquire various information by using these parts. The head part 2A also has an image display portion 9 and a speaker 10 arranged thereon and can output various information. However, the structure of the head part 2A is not limited to such a structure. For example, the image display portion 9 may be constituted by an LED (light-emitting diode) so as to give expressions.

The trunk part 2B has an operator 11 arranged on its back portion and also has an antenna 12 arranged at a site corresponding to the tail, so that the operation by the user can be detected via the operator 11 and the antenna 12. The trunk part 2B also has a slot so that an IC card is loaded into the slot to enable execution of version up of the software and the like.

Moreover, a controller 15 for processing various information inputted and outputted via the head part 2A and operation information of the operator 11 and the like, a power-supply unit 14 for supplying power to each part, and a communication unit 16 for transmitting and receiving various information via the antenna 12 are arranged on the trunk part 2B, and a battery 17 is arranged on the lower part thereof.

On the other hand, the moving unit 3 is formed by arranging four legs, each of which has an actuator and an angle detection sensor at a site corresponding to the joint. The moving unit 3 is connected to the body 2 by a serial bus and operates under the control of the body 2. Thus, the robot device 1 can move by four-legged walking.

Moreover, the rear legs can be detached from the body 2. In the robot device 1, a moving unit having wheels can be attached instead of the rear legs. Thus, the form of this robot device 1 can be changed between the four-legged moving form (hereinafter referred to as four-legged type) and the wheeled moving form (hereinafter referred to as wheeled type) in accordance with the preference of the user.

Figure 2:
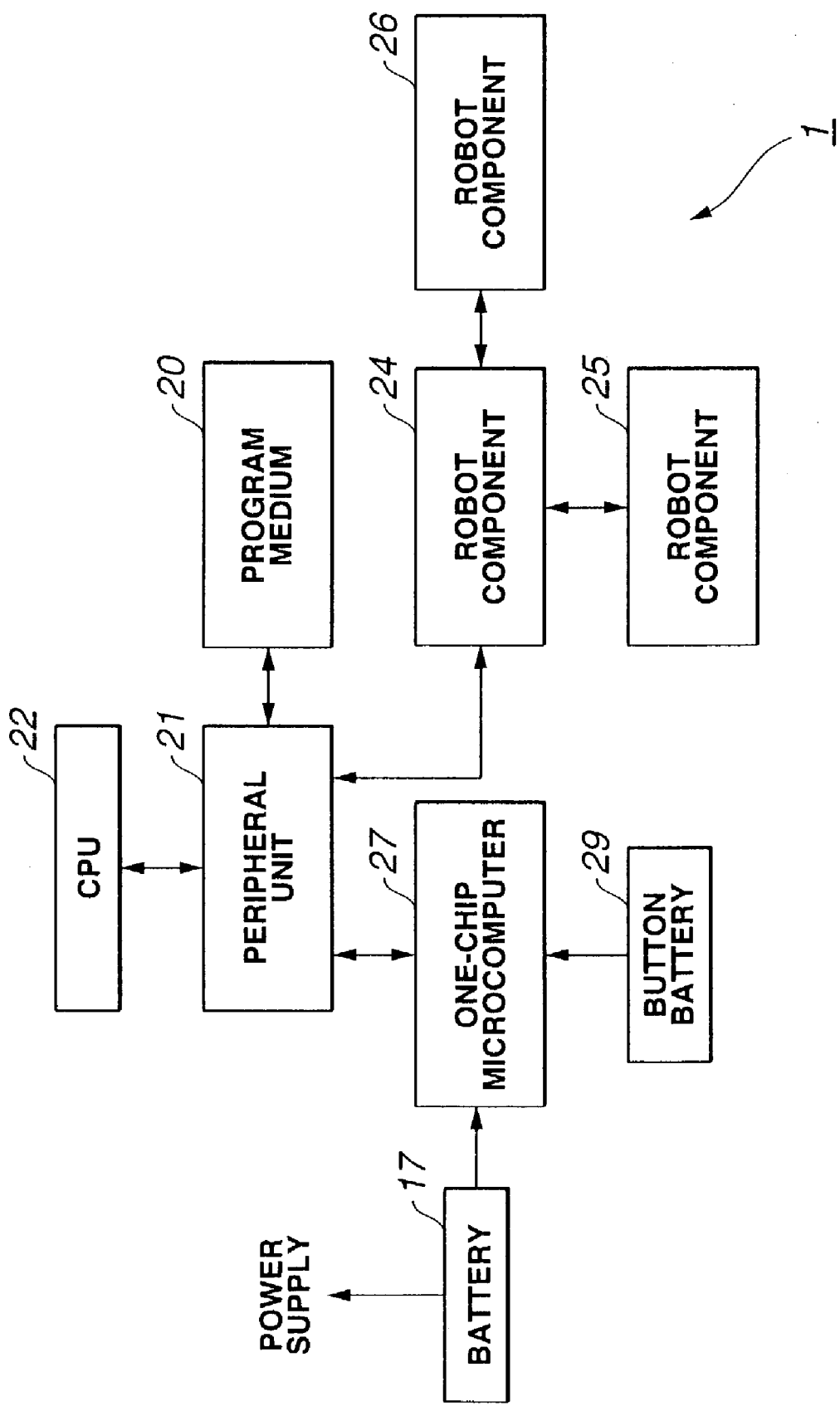
FIG. 2 is a block diagram showing the structure of the robot device.

FIG. 2 is a block diagram showing the structure of this robot device 1. In the robot device 1, a program medium 20 having a processing program recorded thereon is connected to a central processing unit 22 via a peripheral unit 21, and the central processing unit 22 executes the processing procedure recorded on the program medium 20. The central processing unit 22 is also connected with robot device components 24, 25, 26, which are the actuators and sensors of the moving unit 3, the television camera 6, the operator 11 and the like via the peripheral unit 21, and can thus control the overall operation.

Similarly, the central processing unit 22 is connected with a one-chip microcomputer 27 for power control which constitutes the power-supply unit 14, via the peripheral unit 21, and controls the operation of the one-chip microprocessor 27 to supply power to the whole body from the battery 17, and in a power-saving mode, to supply power to the whole body from a button battery 29 instead of the battery 17.

As will be described later in detail, the central processing unit 22 has the function of control means which has a plurality of information processing processes (objects) and is adapted for carrying out control processing based on inter-process communication (inter-object communication) carried out between the information processing processes (objects), and which controls accesses by the plurality of information processing processes (objects) to a shared memory shared by the plurality of information processing processes (objects) and thus carries out inter-process communication (inter-object communication).

(1-2) Software Structure

Figure 3:
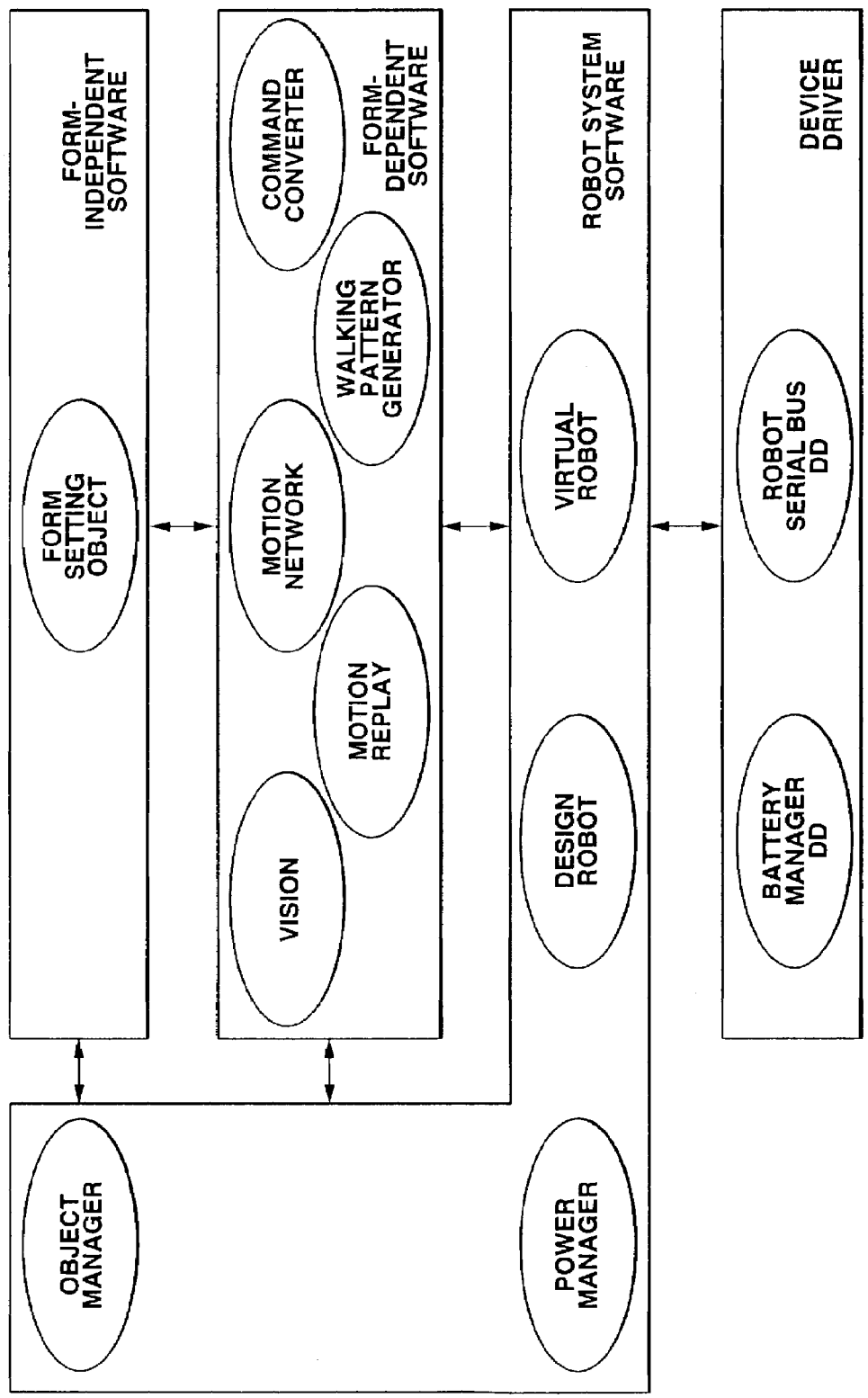
FIG. 3 is a diagram showing the software structure of a four-legged type.
Figure 4:
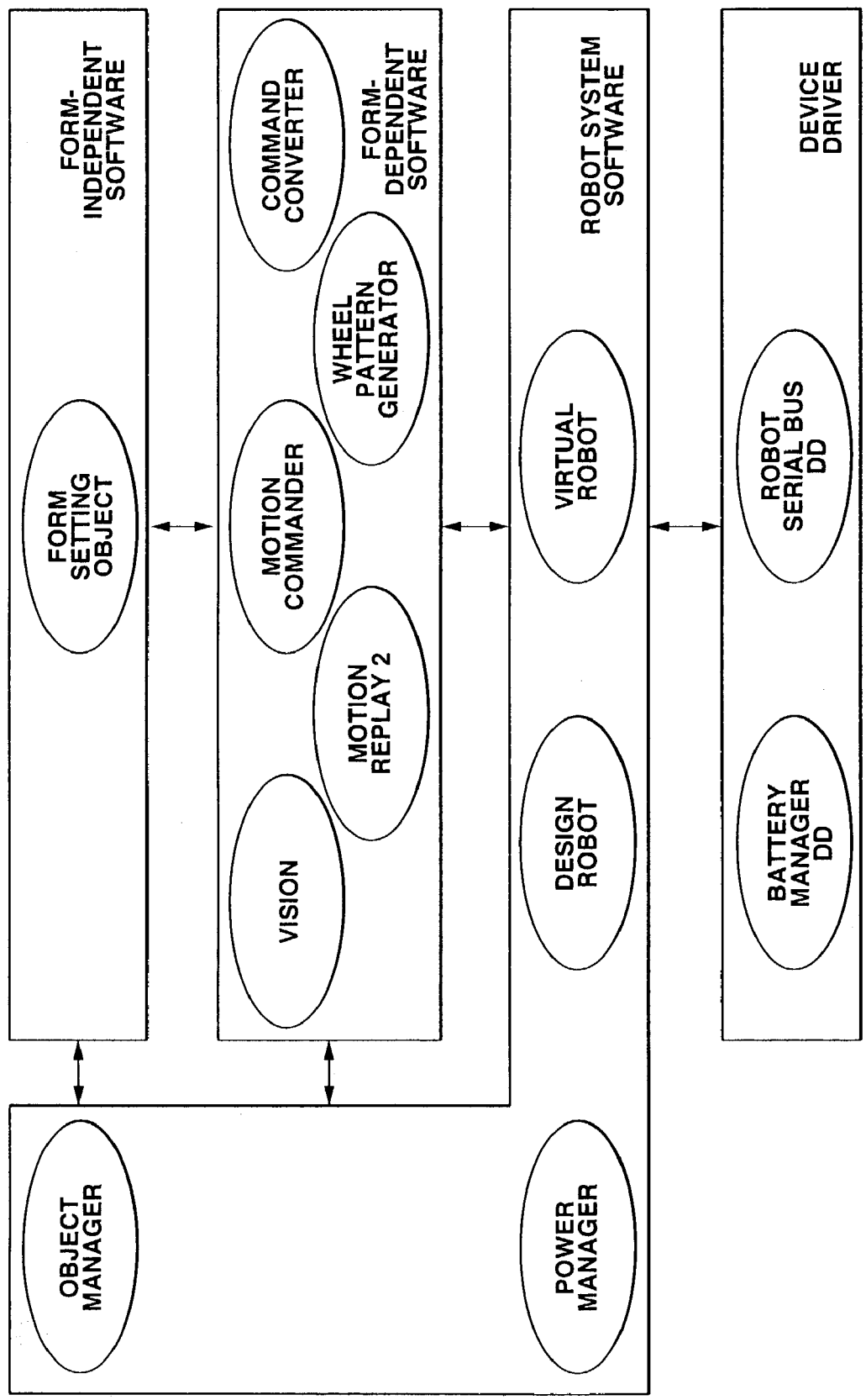
FIG. 4 is a diagram showing the software structure of a wheeled type.

FIG. 3 is a diagram showing, as layers, the software structure of the robot device 1 of the four-legged type. FIG. 4 is a diagram showing the software structure of the wheeled type in comparison with FIG. 3. In these software structures, the lowermost layer is a device driver layer, where various device drivers are arranged. The device drivers carry out input/output of various information from/to the sensors and actuators of the moving unit 3 and the various robot device components arranged on the head part 2A and the like, and have software objects for processing such information.

Of these device drivers, a battery manager device driver (battery manager DD) detects the remaining power of the battery 17 through data communication with the one-chip microcomputer 27 of the power-supply unit 14, and periodically notifies upper-layer robot system software of the detected remaining power. The battery manager device driver also manages the clock of the central processing unit 22 or the like, then reduces the frequency of the clock in accordance with an instruction from the robot system software and stops the operation of unnecessary devices, thus reducing the overall power consumption.

A robot serial bus device driver (robot serial bus DD) takes sensor information and the like of the moving unit 3 connected to the serail bus arranged in the body 2 through data communication with hardware for master control of the serial bus, and notifies the upper-layer robot system software of the sensor information and the like. Moreover, the robot serial bus device driver sends control data of the actuator, audio signals and the like outputted from the robot system software, to the respective devices.

In start-up of the system, the robot serial bus device driver detects a change (addition or deletion) of a device connected to the serial bus. Furthermore, the robot serial bus device driver takes information proper to the device related to this change and thus outputs information indicating the current form of the robot device 1 to the robot system software.

The robot system software is arranged on the upper layer than the device driver layer. The robot system software is constituted by software objects such as a virtual robot, a design robot, a power manager, and an object manager.

Of these software objects, the virtual robot converts data of a format proper to each device to a common formal of the robot device and then transmits and receives the data, in data communication with the robot serial bus device driver. Specifically, for example, with respect to motor control data, a sensor output of a potentiometer in a format proper to the device is expressed by 10-bit data resulting from analog-digital conversion, whereas the virtual robot converts the data of this expression to data such that the lowest one bit indicates 0.001 degrees and outputs the data in a common format in the robot device 1. Moreover, in addition to such transmission/reception of format-converted data, the virtual robot outputs image data acquired by, for example, the television camera 6, to the upper software.

The virtual robot also receives information indicating the current form of the robot device 1 from the robot serial bus device driver and put the information together. Thus, the virtual robot manages connection information (CPC (configurable physical component) connection information) indicating which robot component is connected in what order in the whole robot device 1, and notifies the design robot of this connection information (CPC connection information).

If a change is made in a device connected to the serial bus, the virtual robot receives a notification from the robot serial bus device driver of the device driver layer and notifies the design robot.

The design robot receives the connection information (CPC connection information) from the virtual robot, then sequentially compares the received connection information with pre-recorded connection template information, and thus selects a template suitable for the current form of the robot device 1. Moreover, in accordance with the selected template, the design robot instructs the object manager to update form-dependent software on the upper layer to form-dependent software suitable for the current form.

In this embodiment, the connection template information is described as design data in a design file.

In accordance with the instruction from the design robot, the object manager updates the form-dependent software to form-dependent software suitable for the current form, using the information relating to objects and connection of the respective objects sent from the design robot. Specifically, the object manager give instructions to stop the operation, cancel the connection of inter-object communication, demolish the object, and open the resource, with respect to all the objects constituting the form-dependent software. The object manager gives further instructions to load newly required objects, initialize the objects, construct connection for inter-object communication, and start up these objects. The connection between objects means the connection for transmitting and receiving data between the objects. This invention relates to such transmission and reception of data between the objects, and as will be described later in detail, this invention realizes inter-object communication by causing the objects to share data on a shared memory via a management object.

The power manager communicates data with the battery manager device driver, and in accordance with the instruction from the software of the upper layer (form-independent software or form-dependent software), the power manager instructs the battery manager device driver to switch the clock and to stop the operation of the object.

The form-dependent software is arranged on the upper layer than the robot system software, and the form-independent software is arranged on the further upper layer. The form-dependent software is the software which is changed in accordance with the form of the robot device 1, and the form-independent software is the upper software of the robot device 1 which is fixed irrespective of the form of the robot device 1. Therefore, various objects depending on the form of the robot device 1 exist in the form-dependent software. In this embodiment, the software suitable for the form of the four-legged type and the form of the wheeled type can be easily constituted by changing the form-dependent software.

Specifically, in The four-legged type, the form-dependent software (FIG. 3) is constituted by objects including a command converter, a motion network, a motion replay, a walking pattern generator, and a vision, as the objects related to the moving unit 3.

The command converter converts a command from the form-independent software which is independent of the form, to a command suitable for the form of the robot device 1. That is, when a command which give an instruction to take a posture to sleep, rest, wake up, or move (command Sleep, Rest, Wakeup or Move) is inputted from the form-independent software as a command related to the moving unit 3, the command converter in the four-legged type converts the command to a command which gives an instruction to take a posture of sleeping, sitting, standing, or walking (command Sleeping, Sitting, Standing or Walking).

Figures 5, 6:
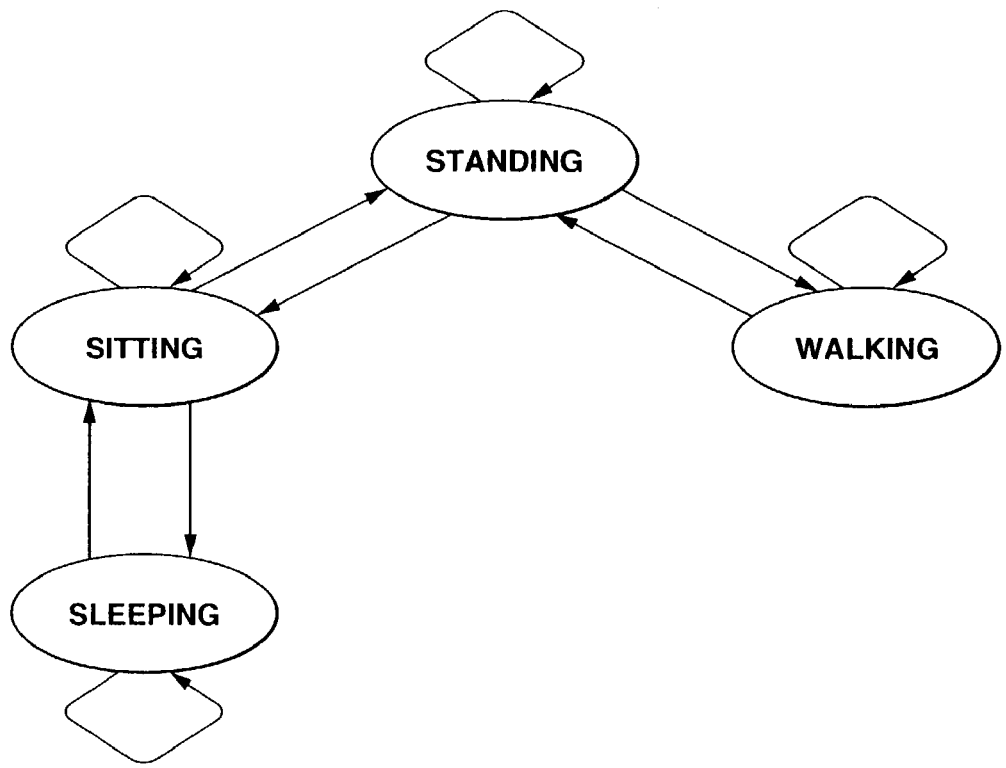
FIG. 5 is a state transition view showing changes in the posture of a four-legged type.
FIG. 6 is a chart showing the relation between input and state.

The motion network starts a method (entry) of an object corresponding to an arrow shown in the transition view of FIG. 5, in accordance with the command indicating the posture outputted from the command converter. That is, if a command for walking is inputted in the sleeping state, the corresponding entries of the motion replay object are sequentially started so that the posture is sequentially changed to sitting, standing and walking. In this case, when the ultimate walking state is reached, an entry of the walking pattern generator corresponding to the self-loop indicating this state is started.

The motion replay outputs joint angle command values for the corresponding posture changes by starting entries of the motion network. Specifically, the motion replay holds registered discrete joint angle command values as key data and outputs a series of angle command values by interpolation processing using the key data.

The walking pattern generator calculates and outputs each joint angle command value so as to move in a direction designated by the form-independent software.

The vision is, for example, an object for image processing, and carries out processing to receive image data acquired by the television camera 6 from the virtual robot object. Thus, the vision identifies, for example, a red object, and detects and outputs the position and apparent size of the red object with reference to the robot device 1.

On the other hand, in the wheeled type, the form-dependent software (FIG. 4) is constituted by objects including a vision object which is common to this wheeled type and the four-legged type, and a command converter, a motion commander, a motion replay 2, and a wheel pattern generator which are specific to the wheeled type, as the objects related to the moving unit 3.

Of these objects, the command converter converts a command from the form-independent software which is independent of the form, to a command suitable for the form of the robot device 1, similarly to the command converter in the four-legged type. In this case, since the robot device 1 is of the wheeled type, the command converter converts commands which give instructions to take postures to sleep, rest, wake up, and move (commands Sleep, Rest, Wakeup and Move), to commands which give instructions to take postures of sleeping, resting, being ready, and going (commands Sleeping, Rest, Ready and Go).

The motion commander receives the output from the command converter and generates a joint angle command value associated with a wheel control command. That is, when the command Sleeping is inputted, the motion commander sets the joint angle command value to neutral. In the neutral state, neither driving nor braking of the motor is carried out. Therefore, the two arms constituting the moving unit are kept hanging down and the wheels are held in a stop state.

When the command Rest is inputted, the motion commander generates a joint angle command value such that the two arms are bent 90 degrees at the elbow parts and held out forward while the face part of the head part 2A faces the front. The wheels are kept stopped.

When the command Ready is inputted, the motion commander generates a joint angle command value such that the two arms are stretched out forward while the face part of the head part 2A faces the front. In this case, too, the wheels are kept stopped. When the command Go is inputted, the motion commander generates a command value such that the wheels rotate to move forward while the two arms are held similarly to the Ready state.

The motion replay 2 controls the operation of the parts other than the wheels (for example, the operation of the two arms) with respect to a motion proper to the wheeled type, in accordance with the instruction from the motion commander. The wheel pattern generator generates wheel control information under the control of the motion commander.

The form-independent software is the software which is independent of the form of the robot device 1 and has a form setting object or the like. The form setting object receives information which is independent of the form of the robot device 1 from the form-dependent software, and by using this information, outputs the commands (Sleep, etc.) indicating the above-described postures of the robot device 1 which are independent of the form of the robot device 1, to the form-dependent software.

For example, if no red object is detected for one minute or more on the basis of the presence/absence of a red object and its position information sent from the vision object, a command is issued such that the Sleep state is maintained as it is, the Rest state is shifted to the Sleep state, the Wakeup state is shifted to the Rest state, and the Move state is shifted to the Wakeup state, as shown in FIG. 6.

On the other hand, if a red object with a size smaller than a predetermined value (not more than a set value 10 of the robot device) is detected and is kept detected for 10 seconds or more, a command is issued such that the Sleep state is shifted to the Rest state, the Rest state is shifted to the Wakeup state, the Wakeup state is shifted to the Move state, and the Move state is continued as it is.

If a red object with a size not less than a predetermined value is detected, a command is issued such that the Sleep state is shifted to the Wakeup state, the Rest and Wakeup states are shifted to the Move state, and the Move state is continued as it is.

Thus, in the robot device 1, the uppermost software is formed to be independent of the form and the form-independent software transmits and receives data in the format independent of the form. Therefore, in the robot device 1, only the form-dependent software, which is dependent on the form, is changed in accordance with the form, thus enabling easy change of software in accordance with the form.

(1-3) Change of Form-Dependent Software

In the robot device 1, the form-dependent software is updated by the processing at the object manager in accordance with an instruction from the design robot. In this embodiment, the form-dependent software is updated by constructing the reconnection for loading, unloading, and inter-object communication of the objects constituting the form-dependent software.

Therefore, the design robot receives a notification of connection information (CPC connection information) specifying the form of the robot device 1 from the virtual robot. On the basis of the connection information (CPC connection information), the design robot instructs the object manager to update the form-dependent software and provides necessary information to the object manager.

The virtual robot acquires information of each device connected to the serial bus via the robot serial bus device driver on the lower layer, then uses this information to prepare connection information (CPC connection information) and sends the connection information to the design robot.

Therefore, in the robot device 1, predetermined information is recorded into the memory of each robot component, and the information of the device connected to the serial bus in the virtual robot can be acquired together with its position information through data communication carried out via the robot serial bus device driver.

In the robot device 1, the television camera, the speaker, the microphone, the various actuators, the sensors and the like are the basic constituent elements (CPC primitives) and a plurality of combinations of these basic constituent elements set in a link state constitute respective components (CPC models). For example, one leg as a component is constituted by a plurality of basic constituent elements consisting of three motors and one switch in a specific link state.

In the robot device 1, proper identification data are allocated to the respective components so that the respective constituent elements connected to the serial bus can be specified by using the identification data. The identification data includes the ID of the factory where the component was manufactured and the ID corresponding to the serial number. Moreover, corresponding to this identification data, the information of each constituent element and the position information of each constituent element in the component are set by link information of each constituent element in the component and attribute information of each constituent element, and such information is held in the memory of each component together with the identification data of each component. In this embodiment, if the component has a small memory capacity, only the identification data is recorded in the memory of each component, and the information of the constituent elements and the position information of the constituent elements in the component are held in the body 2.

At the start-up of the system, or when the device is changed, the virtual robot sequentially traces the serial bus of the tree structure in accordance with the identification data, the position information and the like sent from the robot serial bus device driver, then prepares connection information (CPC connection information) by using the respective basic constituent elements (CPC primitives) and the data structure representing the order of connection of the respective constituent elements, and notifies the design robot of the connection information. In this case, the connection information (CPC connection information) sent by the virtual robot is constituted by constituent element information (CPC primitive location information) corresponding to the form.

The design robot refers to the design file on the basis of the connection information (CPC connection information) sent from the virtual robot and thus selects a connection template (that is, a label which will be described later) corresponding to the current form of the robot device 1. Moreover, in accordance with the selected template, the design robot instructs the object manager to update the form-dependent software to form-dependent software suitable for the current form.

The design file includes description of the text data format, in which a group of constituent element information (CPC primitive location information) of each component is described with a label appended thereto, for each form of the robot device 1. The constituent element information (CPC primitive location information includes the basic constituent elements (CPC primitives) of each component and the position information (CPC coordinate locator) of each constituent element. Of such information, the position information (CPC coordinate locator) is the coordinate from a reference position set for the robot device 1. The coordinate is represented by a general link coordinate system and is constructed by cascade connection of a rotation matrix and a positional vector for transformation of the coordinate system.

The label specifies the corresponding object and also specifies the necessary data for loading of the object and construction of inter-object communication. A design label, or a virtual label having the description which is more general and easier to understand than a design label, or a composite label constituted by combining a design label and a virtual label is applied. A visual label is replaced with a design label by the design robot for use.

The following formula represents the description of the design label. The design label is constituted by one or more pieces of constituent element information (CPC primitive location information) or a design label (Design Label).

```
Design Label (
    CPC Primitive Location Information or Design Label;
    ......
)                                                        (1)
```

On the other hand, the following formula represents the description of the virtual label (Virtual Label). The virtual label is constituted by a design label (Design Label), a constituent element (CPC Primitive), and position information (CPC Coordinate Locator) of the constituent element (CPC Primitive).

```
Virtual Label (
    Design Label:
    CPC Primitive:
    CPC Coordinate Locator:
)                                                        (2)
```

The following formula represents the description of the composite label (Composite Label).

```
Composite Label (
    Composite Label;
    or/and Design Label:
    or/and Virtual Label;
)                                                        (3)
```

In this case, if there exits the position information (CPC coordinate locator) defined within the virtual label on the distal end side of the tree structure from the specified position information (CPC coordinate locator) in the constituent element information (CPC primitive location information) specified by the connection information (CPC connection information) sent to the design robot, the design robot replaces the virtual label with the design label and sets such a design label to be effective.

Thus, by accessing the design file in accordance with the connection information (CPC connection information), the current form (such as the four-legged type and the wheeled type) of the robot device can be specified and various data necessary for updating the form-dependent software can be acquired.

Figure 7:
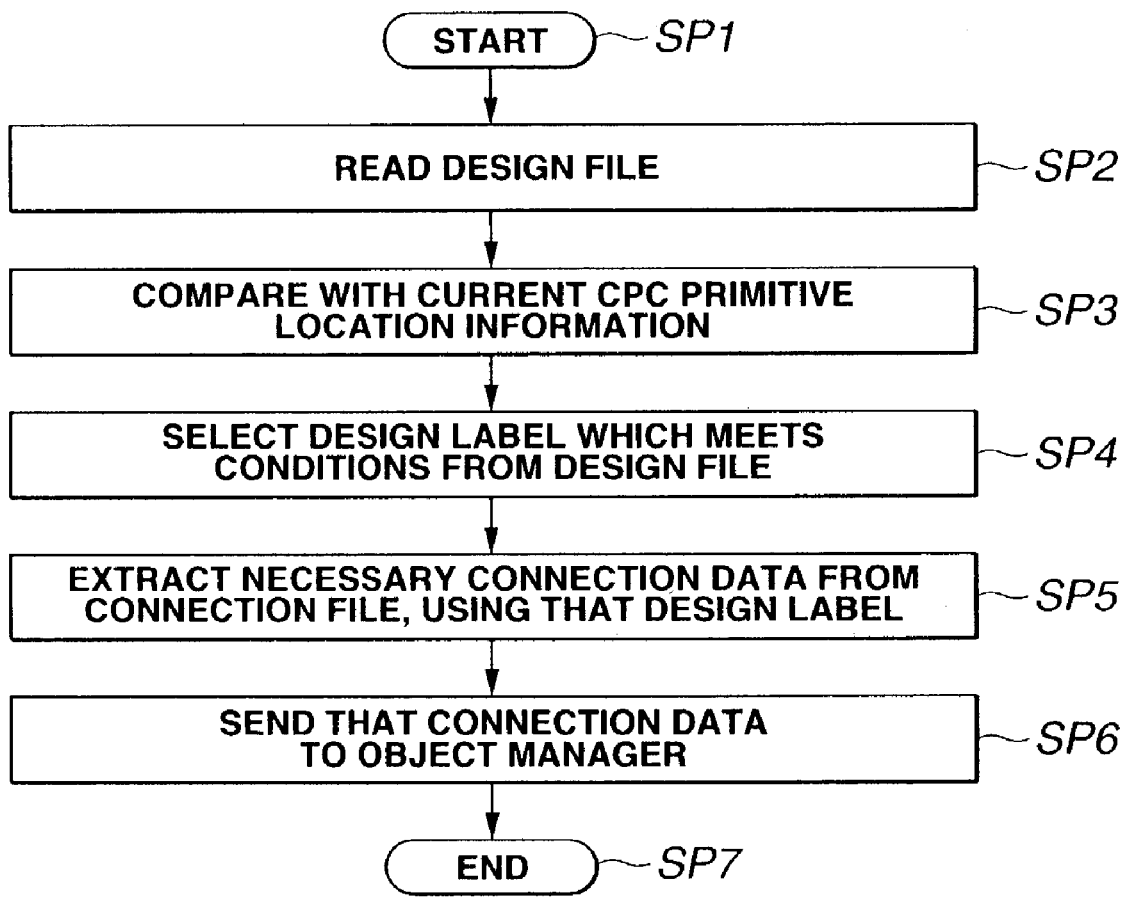
FIG. 7 is a flowchart showing the processing procedure of a design robot.

FIG. 7 is a flowchart showing the specific processing procedure of the design robot. When the design robot is notified of connection information (CPC connection information) from the virtual robot, the processing shifts from step SP1 to step SP2 to access the design file in accordance with the connection information (CPC connection information), thus specifying the current form of the robot device 1.

Then, the processing at the design robot shifts to step SP3 to compare the constituent element information (CPC primitive location information) based on the connection information (CPC connection information) sent from the virtual robot with the constituent element information (CPC primitive location information) based on the connection information (CPC connection information) held in the design file.

The processing at the design robot shifts to step SP4. The design file is accessed on the basis of the result of the comparison and a design label is detected which specifies an object corresponding to the current form and necessary data for reconstructing inter-object communication.

Then, the processing at the design robot shifts to step SP5. A connection file is accessed in accordance with the detected design label and the connection information corresponding to the label is detected, thereby acquiring necessary data for specifying the corresponding object and for reconstructing inter-object communication. In this case, the connection file is a file in which the connection information (connection data) is recorded in association with the label. The connection information (connection data) is necessary data for specifying the corresponding object and for reconstructing inter-object communication.

The processing at the design robot shifts to step SP6. The connection information (connection data) is sent to the object manager, thus instructing the object manager to update the form-dependent software. After that, the processing shifts to step SP7 to end this processing procedure.

FIG. 8 is a chart showing the description of a part of the design file. In this design file, "DRX" is the description to represent the form of the robot device 1 and 4 Legged is the description to represent the form of the four-legged type. "Head," "RightFrontLeg," "LeftFrontLeg," "RightRearLeg," and "LeftRearLeg" represents a head part, a right front leg, a left front leg, a right rear leg, and a left real leg, respectively. Thus, the first sentence specifies that the four-legged type includes a head part, a right front leg, a left front leg, a right rear leg, and a left rear leg.

"Wheel" in the second sentence represents the wheeled type. Compared with the first sentence, the second sentence specifies that the wheeled type includes a head part, a right front leg, a left front leg, a right rear wheel, and a left rear wheel. The third sentence describes the arrangement of camera link in the head part. The fourth sentence describes a virtual label of the camera link. The fifth and subsequent sentences describe the position information (CPC coordinate locator) for the right front leg, the left front leg and the like in a tree format.

FIG. 9 is a chart showing the description of a part of the connection information (CPC connection information). In this embodiment, the connection information, too, is described in a text data format similar to the design file. In this description, "Joint" represents an interface, indicating that this portion is a connection site with another constituent element. In this case, it can be learned from the description of the second to fifth rows that a television camera is connected via five hubs or the like which are expressed as CO, CO, CO, CO, CO.

The connection information (CPC connection information) in the example of FIG. 9 coincides with the four-legged type, which is described above with reference to FIG. 8.

On the other hand, the following formula represents the description of a part of the connection file. The connection file is described in a text data format. In this description, the first sentence and second sentence describe the objects corresponding to the legs of the four-legged type and the wheels of the wheeled type, respectively, and necessary data for constructing inter-object communication for these objects.

Specifically, in the first sentence, an object name "MoNet" as a service name, a data format "MoNetOutData," and "S" representing a subject are described. Moreover, an object name "MoNetReplay" as a similar service name, a data format "MoNetOutData" and the like are described.

Finally, the description of "O" representing an observer is allocated. Similarly, a subject, an observer, a data format and the like are described in the subsequent row.

```
DRX 4Legged (
    MoNet.MoNetOutData..S, MoNetReplay.MoNetOutData...O
    MoNet.MoNetOutData..S, WalkingPatternGenerator.MoNetOutData...O
)
DRX Wheel (
    MotionConverter.MCData..S, MotionReplay2.MCData...O
    MotionConverter.MCData..D, Wheel.MCData...O
)
```
(4)

Thus, in the case of FIG. 8, the design robot extracts the connection information (connection data) (description in parentheses after DRX4Legged)from the description of the first sentence based on DRX4Legged, and notifies the object manager of the connection information, thereby updating the form-dependent software.

Figure 10:
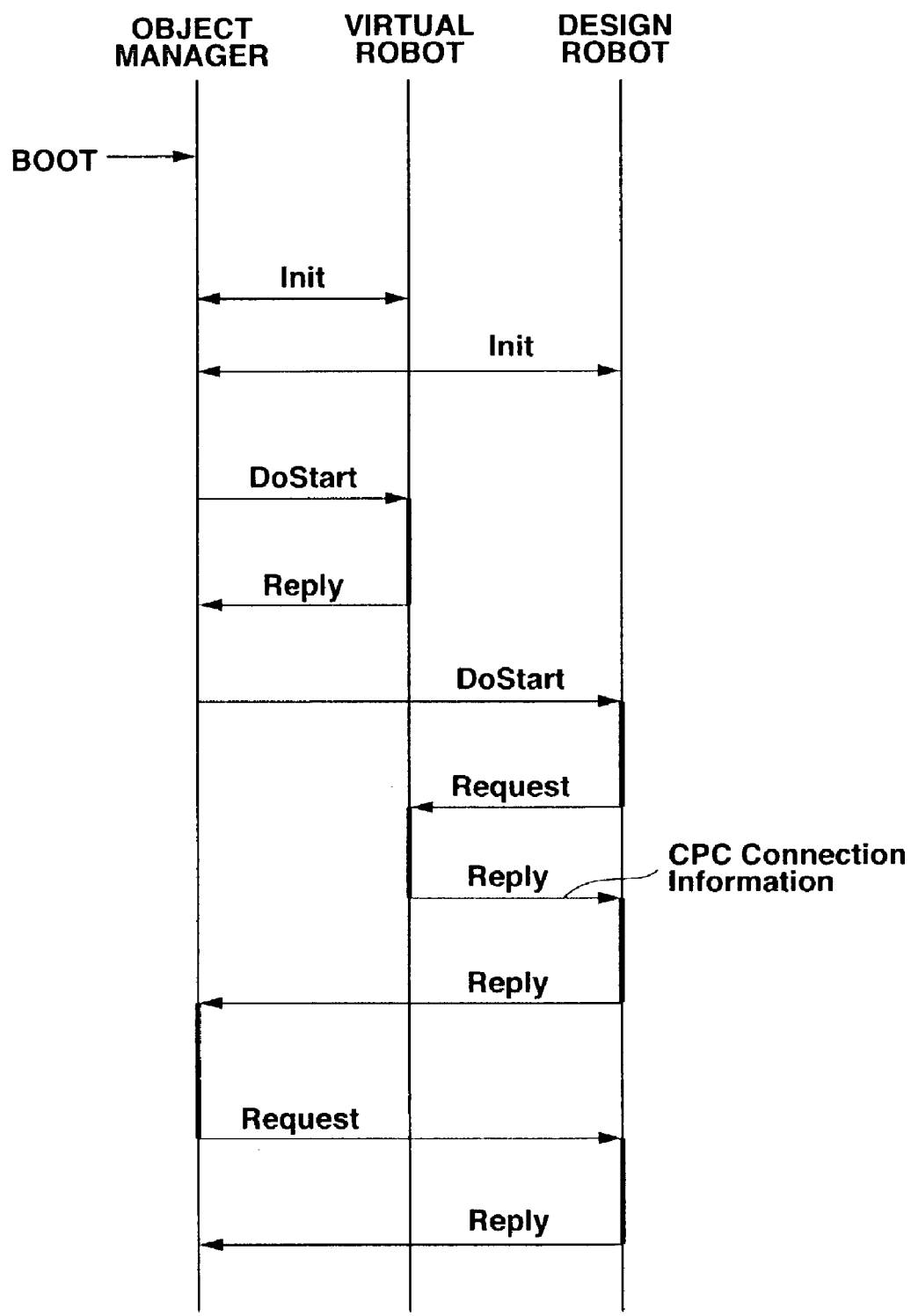
FIG. 10 is a time chart showing the operations of an object manager, a virtual robot and a design robot after boot.

FIG. 10 is a time chart showing the processing at the object manager, the virtual robot and the design robot at the time of boot. When the power of the robot device 1 is turned on or the robot device 1 is reset, the boot processing is started. At this point, in the robot device 1, each object is loaded from the file to construct the form-dependent software, and the internal variable of each object manager is initialized.

Then, a do-initialize command (DoInit) is sent from the object manager to each object, and a query entry of each object is registered to the object manager or the like in accordance with the DoInit command. Thus, each inter-object communication is constructed on the robot system software layer.

Then, a DoStart command is sequentially sent to the virtual robot and the design robot from the object manager, and the virtual robot and the design robot start the operation. The virtual robot generates connection information (CPC connection information), and in response to a request from the design robot, this connection information (CPC connection information) is sent to the design robot, which generates connection information (connection data). Moreover, the connection information (connection data) is sent to the object manager and the form-dependent software is constructed by this connection information (connection data).

At the time of shutdown, a DoStop command is sent to each object from the object manager. In accordance with this DoStop command, each object issues an error with respect to all requests and stops the operation. Subsequently, a DoDestroy command is sent to each object from the object manager. Accordingly, each object opens the source which has been used, and deletes the entry registered to the object manager. Then, each object enters the standby state.

Thus, even if the robot device 1 is booted with its form changed, it can operate by using the software suitable for the changed form.

Figure 11:
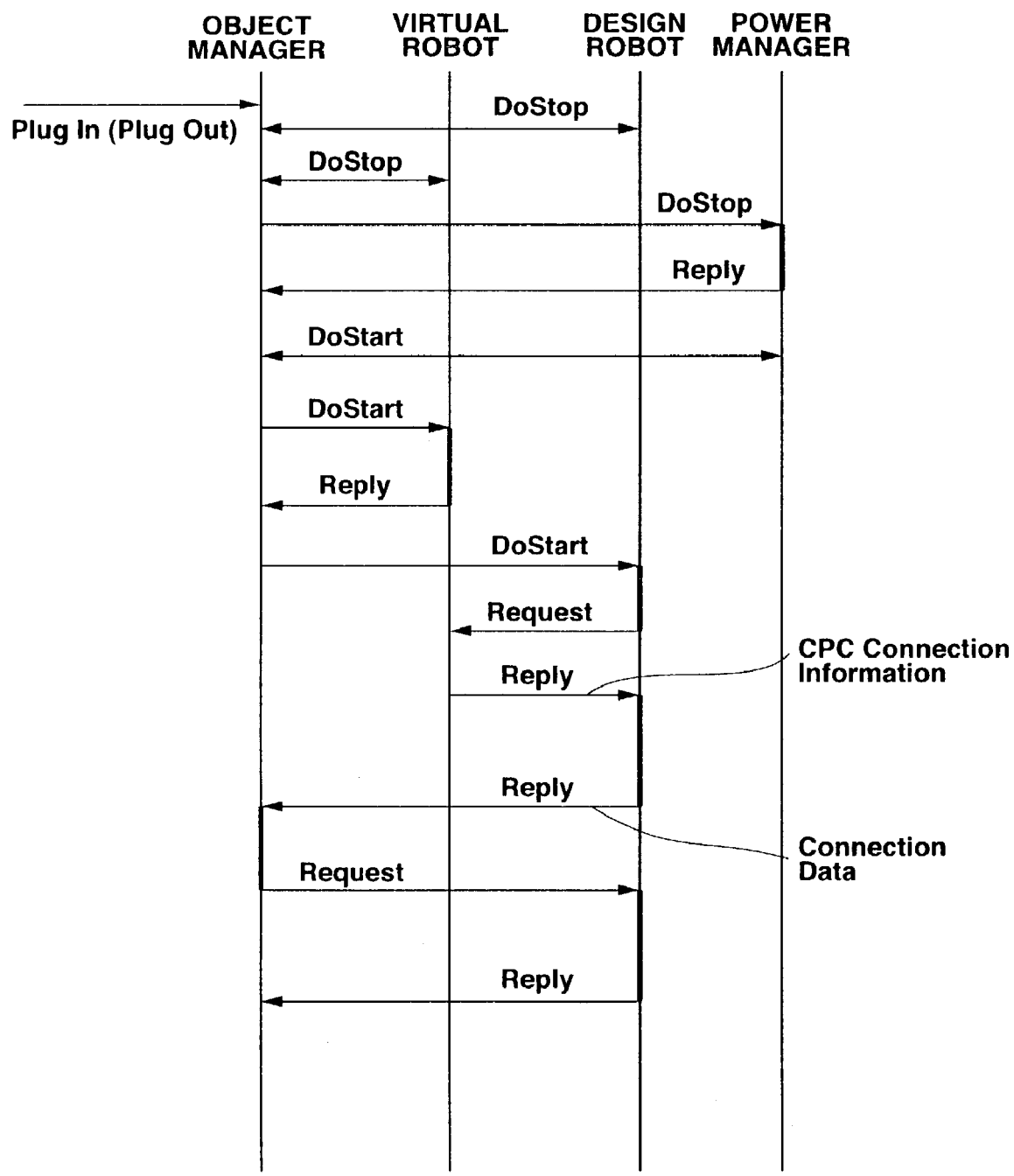
FIG. 11 is a time chart showing the operations of an object manager, a virtual robot and a design robot at Plug-In or Plug-Out.

Meanwhile, at the time of so-called plug-in and plug-out, a DoStop command is sent to each object from the object manager, and in accordance with this DoStop command, each object issues an error with respect to all requests and stops the operation, as shown in FIG. 11.

Then, similarly to the case of boot, a DoStart command is sequentially sent to the virtual robot and the design robot from the object manager. The virtual robot generates connection information (CPC connection information), and this connection information (CPC connection information) is sent to the design robot, which generates connection information (connection data). The form-dependent software is constructed by this connection information (connection data).

Thus, even if the form is dynamically changed by plug-in or plug-out, the robot device 1 can operate by using the software suitable for the changed form.

If the battery 17 is used up, the processing in accordance with a DoStop command and a DoStart command, similar to the case of plug-in or plug-out, is repeated in response to a slate change request from the battery manager. Thus, if the battery 17 is used up, the clock frequency is reduced and the operations of unnecessary devices are stopped, thus changing the state so that the robot device operates by using the button battery 29. On the other hand, if a charged battery 17 is loaded, the clock frequency is increased and the operation of each device is started so that the robot device operates by using the battery 17.

(1-4) Processing at Object Manager

The object manager reconstructs objects constituting the form-dependent software in accordance with the notification from the design robot which is executed as described above, and thus updates the form-dependent software. Specifically, the object manager loads or unloads the objects in accordance with the notification from the design robot and reconstructs inter-object communication corresponding to the loading and unloading, thus changing the form-dependent software.

When constructing this inter-object communication, if the corresponding object names have to be registered to the objects, the independence of the respective objects is hindered and a plurality of types of objects must be prepared so as to correspond to free forms. Therefore, in this embodiment, the object manager constructs inter-object communication on the basis of the connection information (connection data) outputted from the design robot and thus secures the independence of the objects. In the following description, specifying a particular object name in the robot device 1 will be avoided for simplifying the explanation. The inter-object communication is carried out asynchronously.

Figure 12:
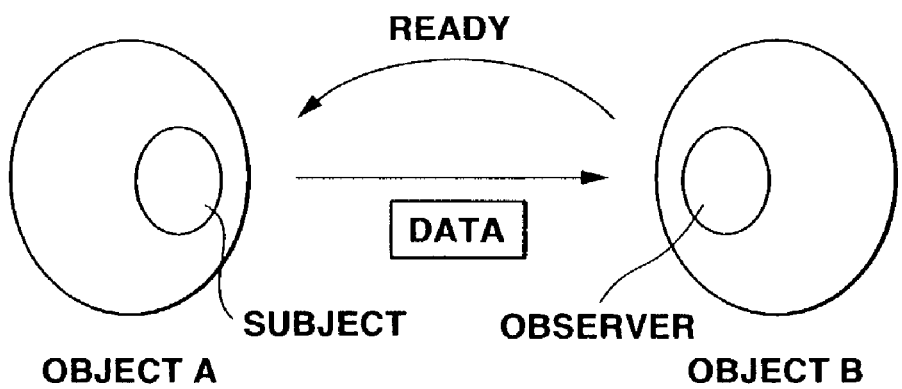
FIG. 12 is a diagram showing the relation between an observer and a subject.

FIG. 12 is a diagram showing the basic structure of inter-object communication between two objects in this embodiment. In this embodiment, the inter-object communication is carried out by using a Ready signal and a Notify signal, so that transmission of the data which exceeds the processing ability of the object (in this example, object B) is prevented.

In FIG. 12, an object A sends data from a subject of a class 0, which is a member of the object A, to a 0 observer class, which is a member of an object B, thus invoking the method of the object B. The subject and the observer referred to in this case constitute so-called surrogate programs in the objects to which they belong.

In such a relation, the subject sends data only when a Ready signal is being sent from the observer. A Ready signal must be sent once for each transmission of data. Thus, the object B on the observer side can wait for the completion of the processing of received data and then receive the subsequent data.

By thus using a Ready signal and a Notify signal, the inter-object communication is carried out. According to this invention, the inter-object communication is realized as the transmitting side and the receiving side share data on a shared memory.

Figure 13:
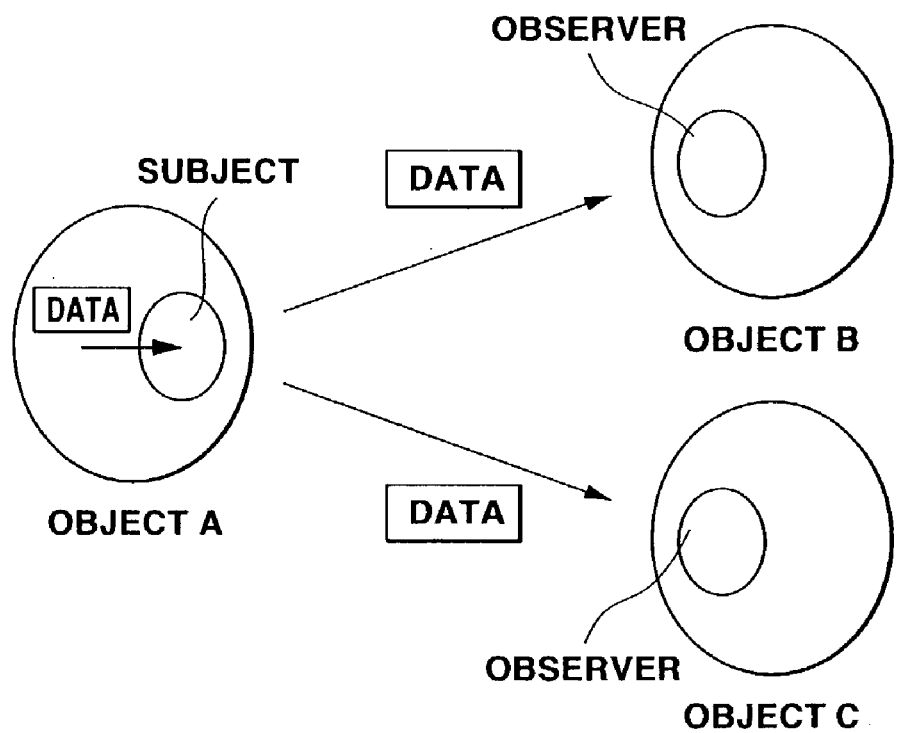
FIG. 13 is a diagram showing the relation between observers and a subject in a multi-observer environment.

FIG. 13 is a diagram showing the basic structure of inter-object communication in a multi-observer environment. In this case, an object A, which is a subject, can distribute data to all the observers and can also distribute data to a specific observer alone that is specified by the object ID. In this embodiment, again, data is sent to the corresponding observer in response to a Ready signal in such a multi-observer environment.

Each object designates the object ID specifying the object and the selector number (that is, method number) specifying the method, thereby starting (entry of) the corresponding method. Then, each object specifies an observer and sends desired data thereto.

Figure 14:
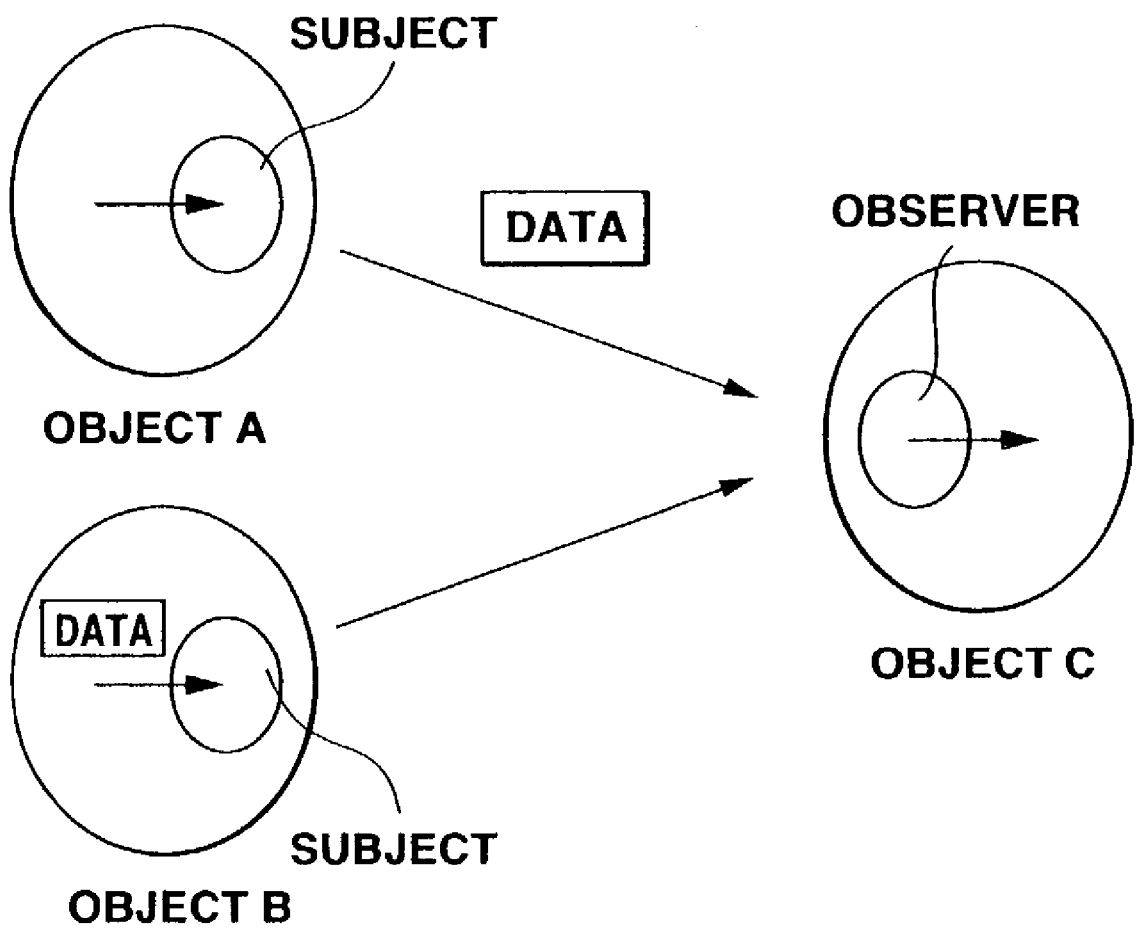
FIG. 14 is a diagram showing the relation between an observer and subjects in a multi-subject environment.

FIG. 14 is a diagram showing the basic structure of inter-object communication is a so-called multi-subject environment. In this case, objects A and B are subjects and an object C is an observer. The observer can receive data from a plurality of subjects, and has its method for processing data invoked every time data is received. Moreover, the observer can send a Ready signal only a specific subject specified by the subject ID and thus can selectively input desired data.

In this embodiment, at least an object belonging to the form-dependent software layer can carry out inter-object communication by using a Ready signal and a Notify signal as described with reference to FIGS. 12 to 14, and also can connect to another object in accordance with a multi-observer or multi-subject connection form, when necessary. That is, an object having a plurality of observers has connection entries of the number corresponding to the number of the plurality of observers.

Figure 15:
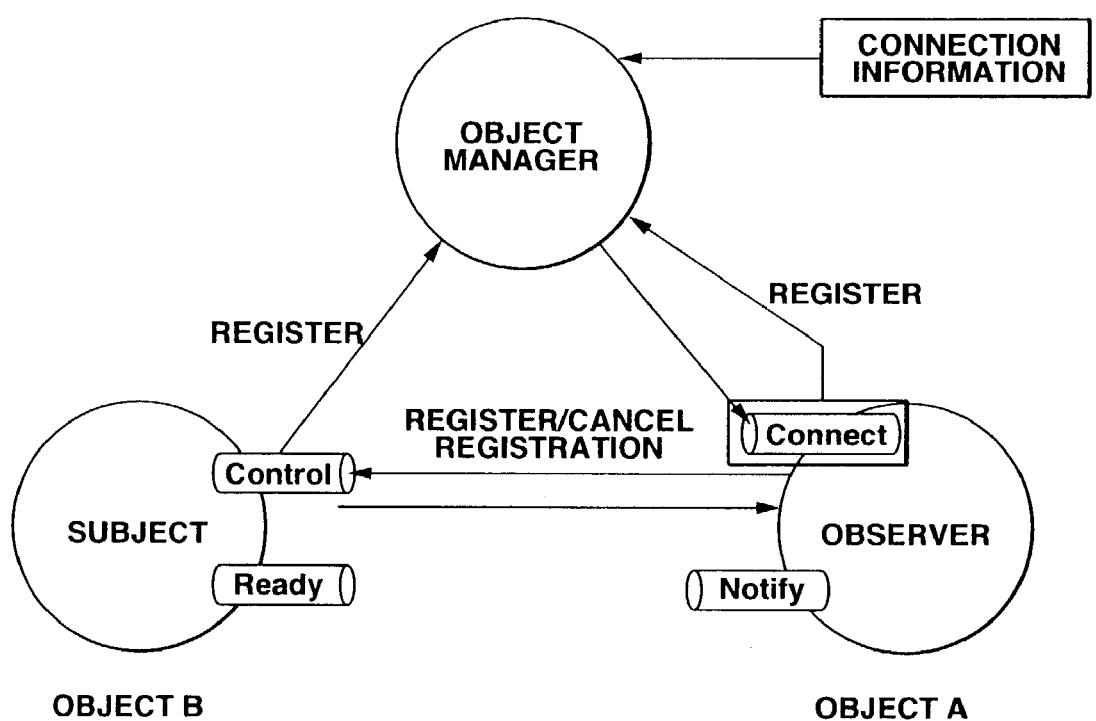
FIG. 15 is a diagram showing the relation between an object manager, an observer and a subject.

FIG. 15 is a diagram showing the relation between the object manager and respective objects. Each of The objects specifies a method in accordance with the object ID and the selector number and then exchanges data. Each of the objects has the selector numbers 0 to 3 allocated to the basic methods, irrespective of the corresponding subject and observer.

A do-initialize (DoInit) command is assigned to the selector number 0 and each object is initialized by starting this DoInit command. A DoStart command is assigned to the selector number 1 and each object is caused to start the operation by starting this DoStart command. A DoStop command is assigned to the selector number 2 and each object is caused to stop the operation by starting this DoStop command. A DoDestroy command is assigned to the selector number 3 and each object is caused to open the resource by this DoDestroy command.

Moreover, in response to these requests from the object manager or in response to a request from another object, each object properly sends the service name, the selector number and the like of the observer by using a return value.

Thus, after the objects are loaded or unloaded by the object manager on the basis of the connection information (connection data) sent from the design robot, the inter-object communication can be reconstructed.

The following formula represents the connection information (connection data) sent from the design robot. The service name of the subject and the service name of the observer are described in a text data format with a comma between them. On the subject side, the object name "FooB," the data format "Image," the corresponding constituent element name "RightCamera," and "S" indicating the subject are described as the service name. On the observer side, the object name "FooA," the data format "Image," the corresponding constituent element name "RightCamera," and "O" indicating the observer are described as the service name.

$$FooB.Image.RightCamera.S, FooA.Image.RightCamera.O \quad (5)$$

When loading an object, the object manager detects the object name of the object to be loaded from the description of this connection information (connection data).

Moreover, the object manager secures a stack memory and a heap memory and loads the object of the detected object name from a predetermined file. In this case, the object manager acquires the object ID from the operating system (OS) and records this object ID together with the object name described in the connection information (connection data).

Thus, the object manager executes the following DoInit, DoConnect, DoStart processing and the like by using the object ID registered in the above-described manner.

In the DoInit processing, on the basis of the acquired object ID and the above-described selector number, the object manager calls a DoInit command with respect to all the objects acquired by loading tile objects. The objects have their respective internal variables initialized in accordance with the DoInit command, and the object manager thus initializes the respective objects.

In this initialization processing, the object manager registers an entry (Control) as a subject of each object and an entry (Connect) as an object in accordance with the notification from each object. The name of the object and the names of the subject and object are registered correspondingly to the description of the subject and object in the connection information (connection data).

In the DoConnect processing, on the basis of the registration in the DoInit processing, the object manager gives a notification of the subject ID (object ID) and the entry (Control) of the subject as a registration target, to the entry (Connect) of each object having an observer. The object, on receiving the notification, accesses the corresponding subject by using the subject ID and the entry (Control) provided in the notification, and the connection of an entry (Notify) is registered. A Ready signal is returned to the observer from the subject for which the connection registration is requested, and the observer and the corresponding subject are thus connected with each other.

In constructing the inter-object communication between the observer and the subject, the object manager gives a notification of the subject ID (object ID) and the entry (Control) of the corresponding subject, to the observer notified of in tile connection information (connection data). Therefore, each object can develop any object as a connection target without explicitly showing it, and also can connect to various objects in accordance with instructions from the object manager, when necessary. Thus, higher independence can be secured than in the conventional technique.

In this case, as the object manager constructs the inter-object communication in accordance with the connection information (connection data), the form-dependent software is updated easily and freely, thus enabling easy change of the software in accordance with the form.

In the DoStart processing, the object manager sends a DoStart command to each object by using the above-described selector number 1. Each object, if it has an observer, sends a Ready signal to the subject by using the subject ID acquired by the DoConnect processing and an entry (Ready). Thus, the state in which data can be received from the corresponding subject is formed and the form-dependent software start the operation.

That is, the subject in the multi-observer environment gives a notification of data, for example, a sensor output, to the observer which is sending a Ready signal, of the registered observers. The observer completes the processing of the received data and sends a Ready signal when it can receive the next data.

In the above-described cases of shutdown, plug-in, plug-out, and state change, the connection information (connection data) sent from the design robot differs from the contents which were previously sent and registered from the design robot. Therefore, the object manager sends a DoStop command to each object by using the above-described selector number 2. In this case, the observer cancels the entry (Ready).

In the DoDisconnect processing, the object manager shuts down the communication connection between the subject and the observer. In this case, the object manager sends a DoDisconnect message to the entry (Connect) of the observer, then causes the observer to issue a disconnection request (Remove Observer) of the entry (Control) to the subject, and thus shuts down the communication connection.

In the DoDestroy processing, the object manager sends a DoDestroy command to the corresponding object by using the above-described selector number 3 and thus destroys the object. In this case, the object cancels the registration which was carried out in the DoInit processing.

In the Object Unload processing, the object manager opens the areas of the stack memory and the heap memory with respect to the object destroyed by the DoDestroy processing and unloads this object. The object manager also deletes the subject ID and the subject name which were registered at the time of loading.

Figure 16:
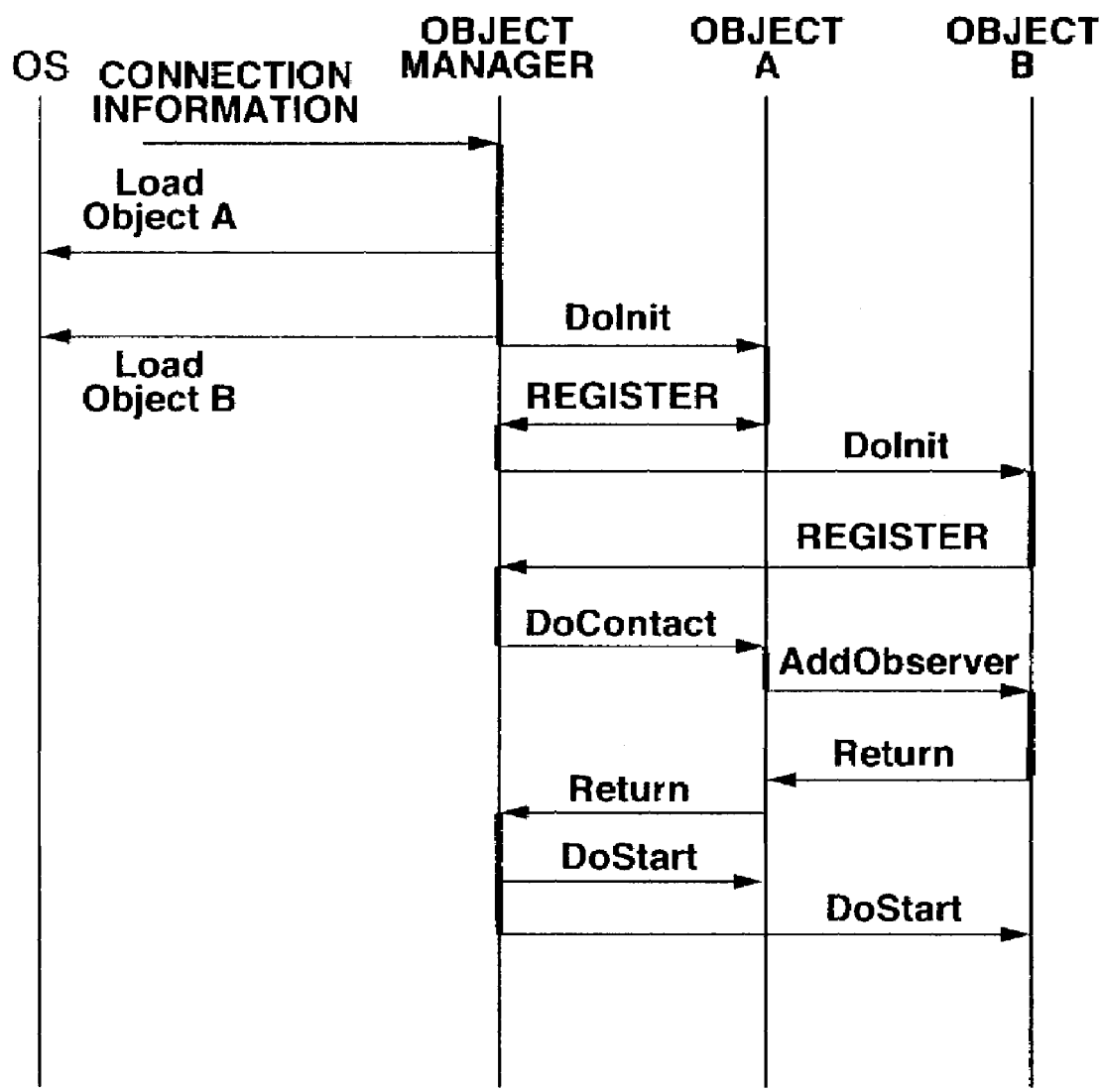
FIG. 16 is a time chart showing the operation of an object manager in the case where connection information is received.

For example, on receiving the connection information (connection data) from the design robot, the object manager controls up to the DoStart processing by using the above-described control processing in accordance with a sequence shown in FIG. 16.

Specifically, when the connection information (connection data) is sent to the object manager by a message, the object manager is started up and loads the object A and the object B described in this connection information. In this case, the object manager loads the object A and the object B in accordance with a system command of the operating system. At this point, the object manager acquires and registers the object IDs of the objects A and B.

Then, the object manager starts the DoInit processing of the objects A and B in accordance with the observer ID acquired as described above and the selector number 0, and thus acquires and registers an entry (Control) as a subject and an entry (Connect) as an object from the objects A and B.

Subsequently, the object manager starts the DoConnect processing of the object A, which is an observer, by using the registered entry (Connect), and connects the object B, which is a subject, to the object A. The inter-object connection is thus constructed on the basis of the connection information (connection data) and the object manager starts the DoStart processing of the objects A and B.

Figure 17:
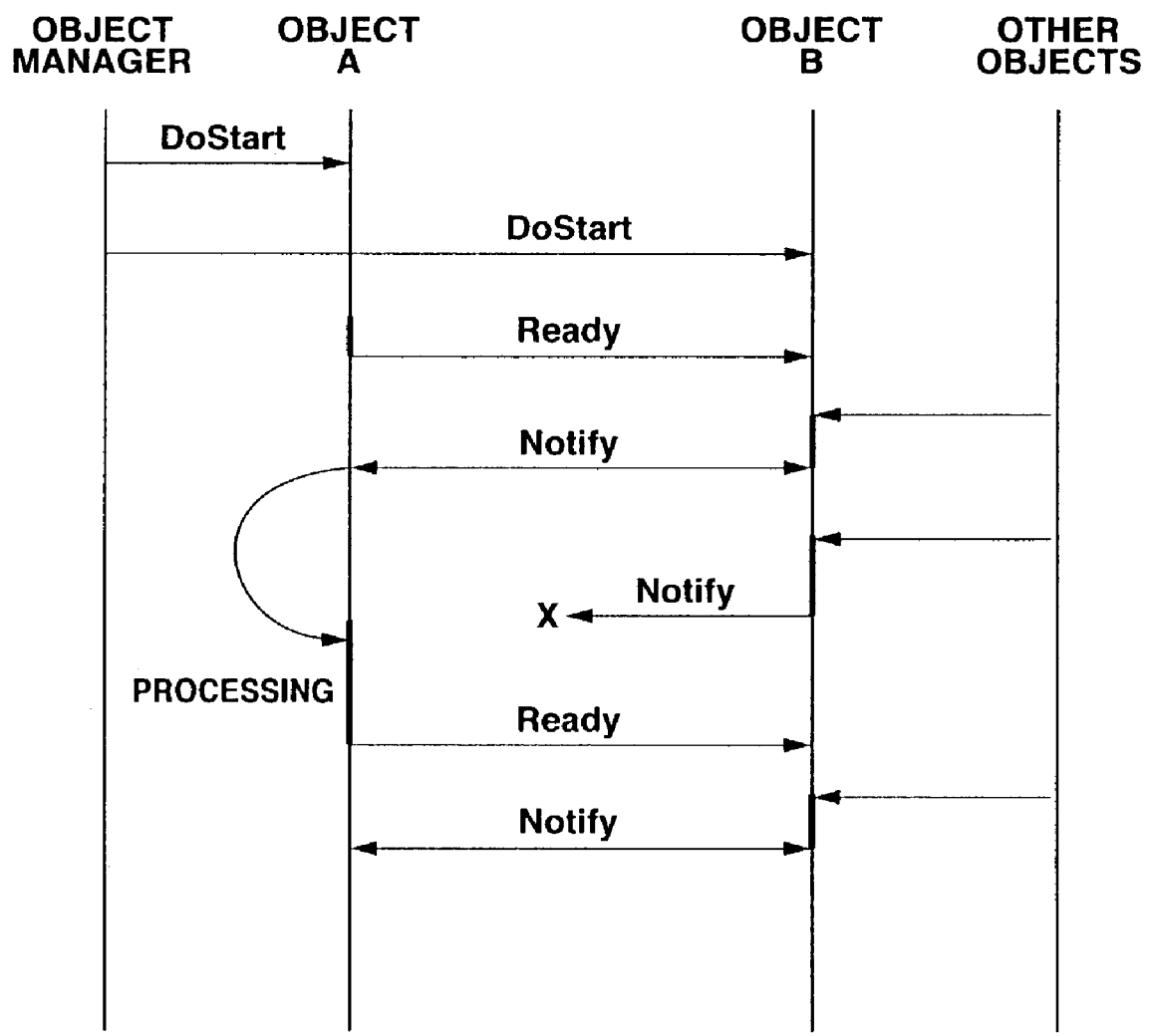
FIG. 17 is a time chart showing the sequence after DoStart.

FIG. 17 is a time chart showing the sequence after the DoStart processing. When the object A, the object B and other objects are started up by the DoStart processing at the object manager, these objects carry out the inter-object communications using the above-described Ready and Notify messages.

In this case, the start-up causes the object A to send a Ready message to a Ready entry of the object B, and a Notify entry of the object A by the object B causes data to be sent to the object A from the object B. If no message is sent to the Ready entry of the object B from the object A during the processing of this data, the Notify entry of the object A by the object B is registered and a Ready entry of the object B by the object A causes data to be sent. Thus, in this inter-object communication, transmission of data which exceeds the data processing ability of the object A is prevented.

Figure 18:
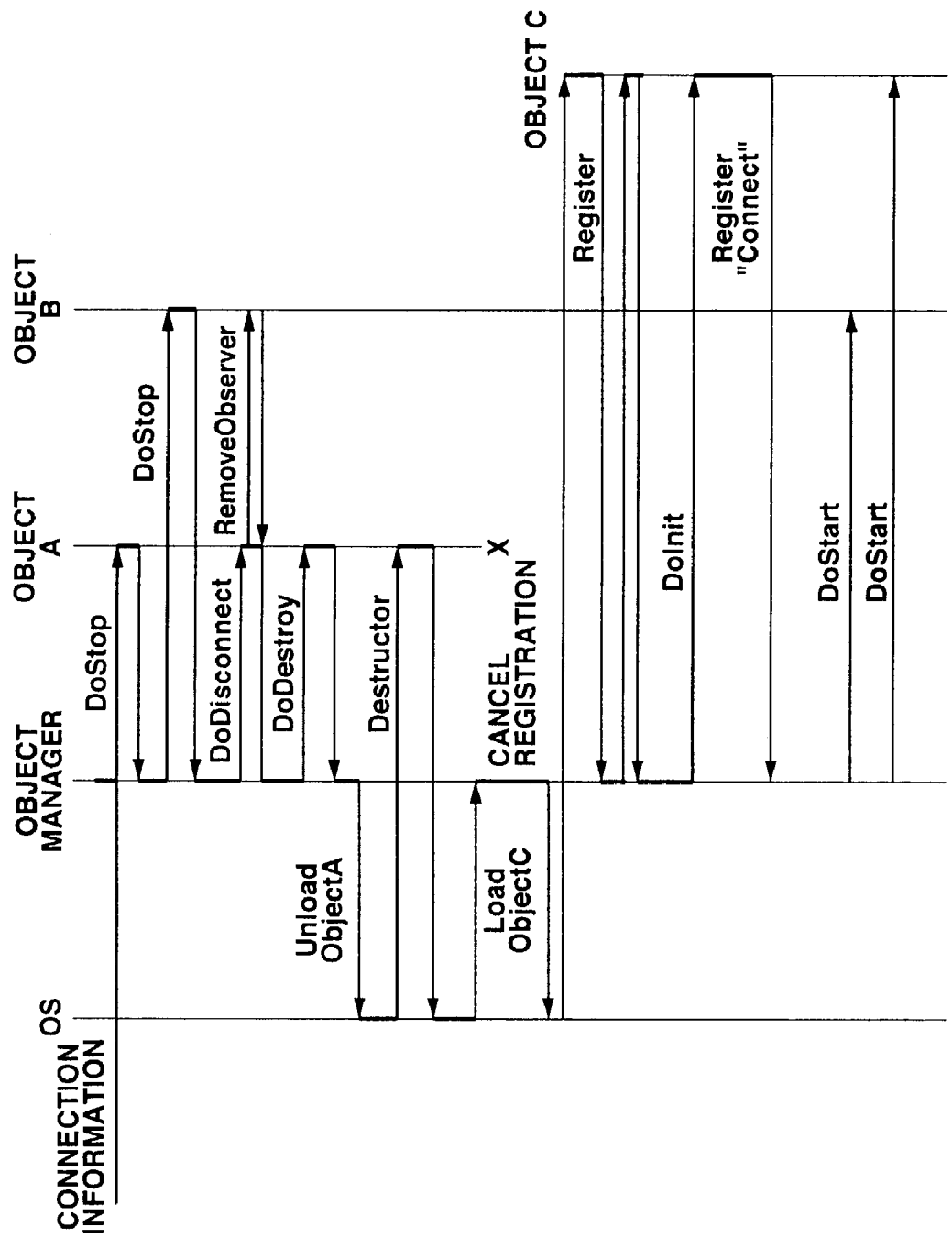
FIG. 18 is a time chart showing the sequence at Plug-In, Plug-Out, and state change.

FIG. 18 is a time chart showing the sequence at plug-in, plug-out, and state change. When the connection information (connection data) sent from the design robot differs from the contents which were previously sent and registered from the design robot, the object manager sends a DoStop command to all the objects to stop the operations of all the objects. In this case, the objects A and B cancel the Ready entries so that their respective Notify entries will not be started thereafter.

On completion of the DoStop processing of all the objects, the object manager in this case sends a DoDisconnect command to the object A to disconnect the object A from the other objects and then starts the DoDestroy processing of the object A. The resource of the object A is thus opened and the registration of the object B carried out by the DoInit processing is canceled.

When the DoDestroy processing of the required object(s) is completed, the object manager executes the unloading in accordance with a system command of the operating system. The destructor of the required object is accessed, that is, in this case, the destructor of the object A is accessed, thereby canceling the registration of the object A carried out at the time of loading. Moreover, the object manager opens the stack memory and the heap memory and thus completes the unloading of the object A.

Then, the object manager gives an instruction to load the object C in accordance with the connection information (connection data), and sequentially starts the DoInit, DoConnect and DoStart processing similarly to the processing described above with reference to FIG. 16. Thus, during the operation, the structure constituted by the objects A and B is changed to the structure constituted by the objects B and C without compiling.

The connection of the objects for carrying out the inter-object communication is described above with reference to FIGS. 12 to 18. Hereinafter, the essential parts of the embodiment of this invention will be described. This invention relates to inter-object (process) communication between objects (processes) and is adapted for realizing smooth inter-object communication.

As described above, the inter-object communication, that is, the input and output of data at the respective objects, are managed by so-called surrogate programs such as the object and the observer. Since data communication between the respective objects is realized by carrying out the predetermined procedure between the subject and the observer, as described above, the design of the structure between the respective objects is easily realized.

In general, the inter-object communication assumes that the respective objects operate in different memory spaces. Therefore, it is considered that the inter-object communication is realized by a technique in which data is copied from the object on the transmitting side to the object on the receiving side over the different memory spaces, or by a technique in which data is arranged on a shared memory which can be referred to from the respective objects (memory spaces).

On the assumption of the technique in which data is copied over the memory spaces, though the processing is easy, copying must be carried out at least twice, for example, copying from the observer to the subject and copying from the subject to the object. Moreover, this technique is disadvantageous to the case where the copy target is large data because the number of time of copying increases in proportion to the number of connections.

On the assumption of the technique in which a shared memory is used by the objects, data must be copied only once to the shared memory and an increase in the number of connections does not affect the number of times of copying. Therefore, this technique has an advantage in performance, compared with the foregoing technique.

However, even if it is assumed that a shared memory is used, since the content of data on the shared memory is the only one, the data must be protected from the use (reference) by all the users if there are a plurality of users (objects using the shared memory), and the data must be protected from writing by one user. That is, since a plurality of users use the data, rewriting of the data by one user must be prevented.

In such a case, it may be possible to cause each user (object) to carry out management (reference management) of the data on the shared memory. However, causing the users to carry out reference management of the data and protection of the data is not only troublesome, but also dangerous if the user fails in the processing and causes destruction of the data.

Therefore, this invention realizes management of the data on the shared memory without requiring the users (objects) to manage the data. Specifically, in the data management to which this invention is applied, the number of times of reference to the shared memory (the number of references or the number of accesses) is measured, thereby managing the data on the shared memory. For example, a technique of automatically measuring the number of times of reference is proposed in "More Effective (C++)," Scott Mayer, Addison-Wesley Publisher, pp.175-205. This invention extends such a technique as a technique for managing the data on the shared memory over different memory spaces.

First, the principle of measurement of the number of references (the number of times of reference), which is a value indicating a user (referrer) of the shared memory, will be described with reference to FIG. 19.

Each user (object) is permitted to access a shared memory M by acquiring a shared memory pointer (hereinafter simply referred to as pointer). Specifically, as shown in FIG. 19, the users who acquired pointers P11, P12 and P13, respectively, are permitted to access a first area M1 of the shared memory. The users who acquired pointers P21 and P22, respectively, are permitted to access a second area M2 of the shared memory. The data in the first area M1 of the shared memory M is shared (referable) by the users who acquired the pointers P11, P12 and P13, respectively. The data in the second area M2 of the shared memory is shared (referable) by the users who acquired the pointers P21 and P22, respectively.

Figure 19:
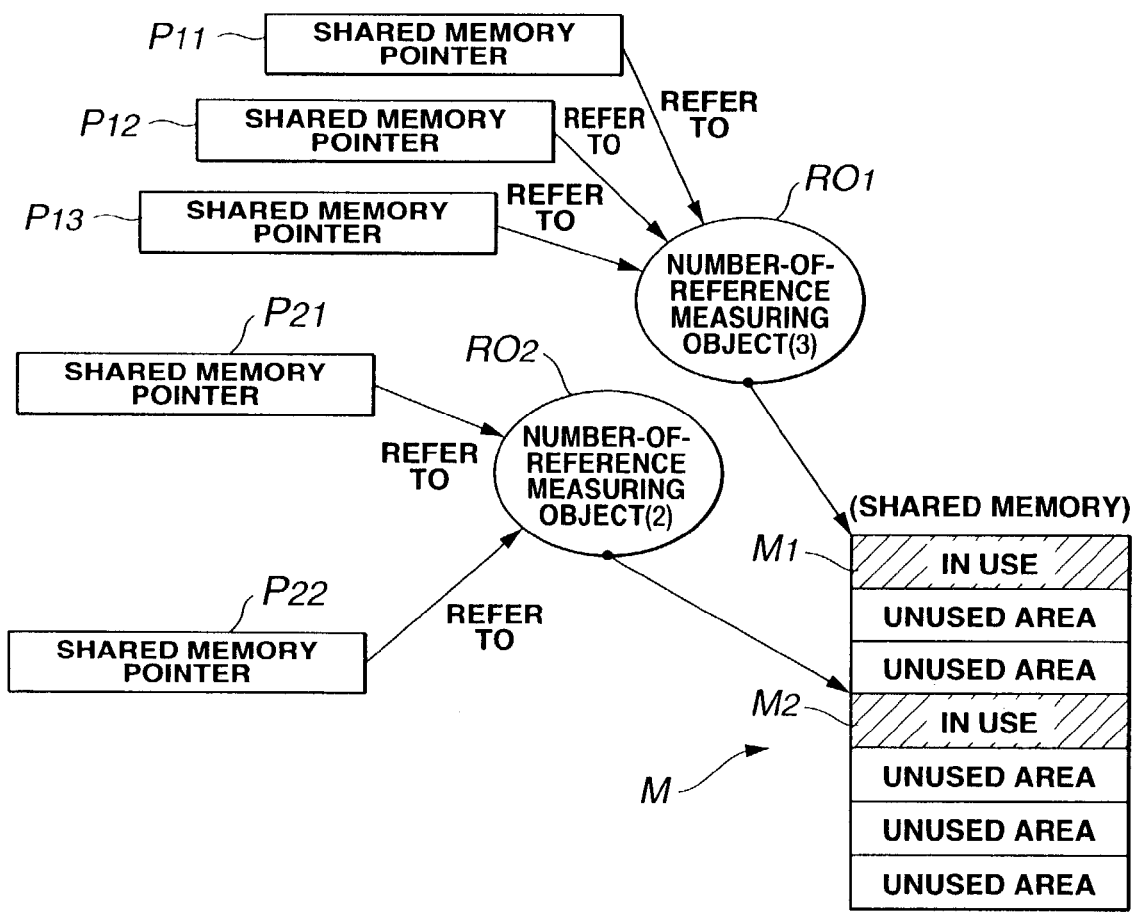
FIG. 19 is a view used for explaining the management of a shared memory by the number of references determined by a number-of-reference measuring object which uses a pointer.

In practice, as shown in FIG. 19, the permission of access (reference) to the respective areas based on the pointers P11, P12, P13, P21 and P22 is realized by holding the number of references (measured) by number-of-reference measuring objects RO1 and RO2. In this case, the number-of-reference measuring object is a number-of-access counting object for controlling the accesses to the shared memory by a plurality of objects on the basis of the number of pointers, which is the number of accesses generated in accordance with the accesses to the shared memory M by the objects. It can also be considered that the number-of-reference measuring object is a communication management object for controlling the accesses to the shared memory M by a plurality of objects. Specifically, the number-of-reference measuring object indicates the sole content on the shared memory and the number of pointers acquired by (or allocated to) the users who are referring to this content.

The number of references by the users to a predetermined area on the shared memory is thus managed. For example, if the number of references measured by the number-of-reference measuring object is two or more, a plurality of users are accessing a predetermined area on the shared memory as indicated by the number-of-reference measuring object. If the number of references measured by the number-of-reference measuring object is zero, no users are accessing a predetermined area on the shared memory as indicated by the number-of-reference measuring object. As will be described later, if the number of references is zero, the number-of-reference measuring object is extinguished and the area which was indicated by the extinguished number-of-reference measuring object is caused to be an unused area.

Figure 20:
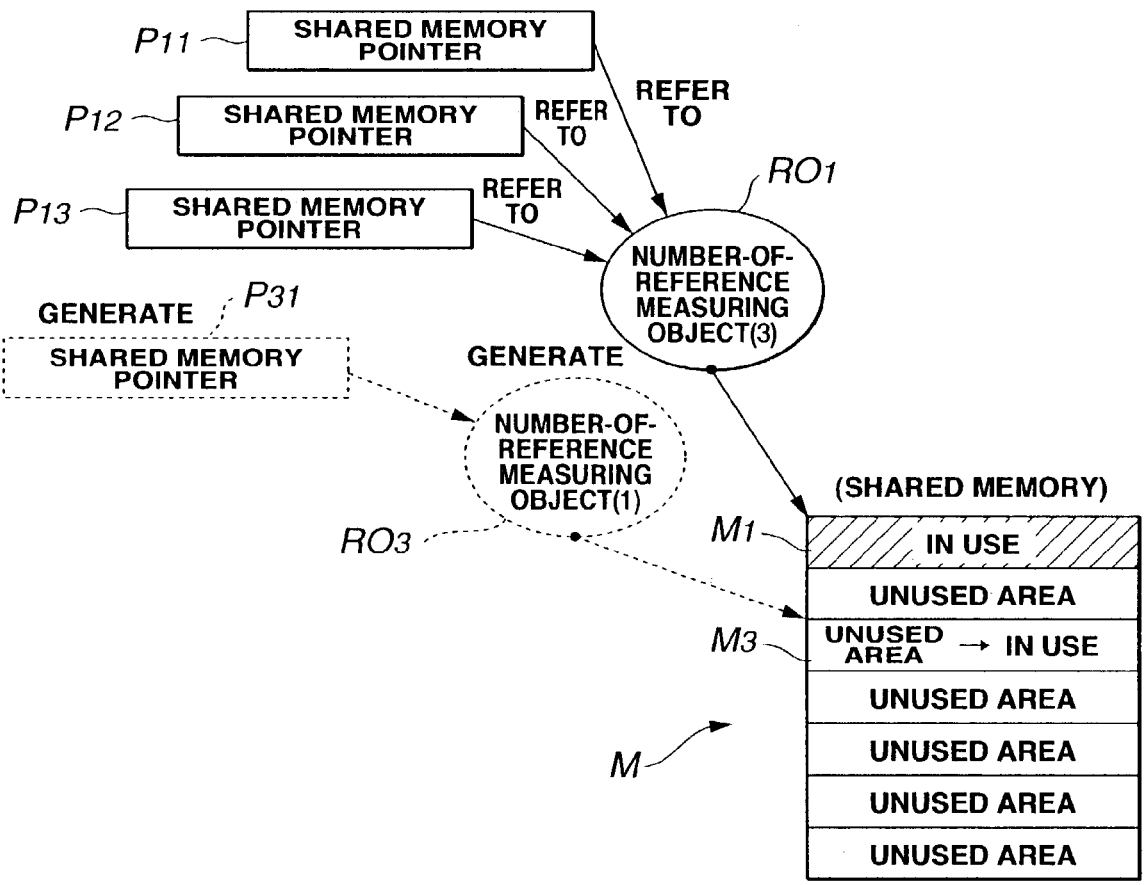
FIG. 20 is a view used for explaining the generation of a pointer.

Referring to FIG. 20, the case of generating a pointer will now be described. In the case of generating a pointer, a shared memory is newly generated (or an area is secured on the shared memory), that is, the shared memory is newly accessed by a user.

In the case of newly securing an area on the shared memory, a pointer P31 used by a user is prepared and a number-of-reference measuring object RO3 corresponding to the pointer P31 is prepared, as shown in FIG. 20. The content indicated by the newly prepared number-of-reference measuring object RO3 is allocated to an unused area M3 on the shared memory M which is pooled by the system. Thus, the user who acquired the pointer P31 indicated by the number-of-reference measuring object RO3 can use the area M3 indicated by the number-of-reference measuring object RO3.

For example, such securing of a new area is carried out in the case where the new area is to be used as a data transmission buffer between objects in the inter-object communication. In this case, the predetermined area M3 on the shared memory M in which data is to be recorded is automatically allocated as a transmission buffer used between process communications in the inter-object communication. By thus securing the new area M3, the data in the area M3 is made shareable between the objects, thus enabling the inter-object communication based on the data shared by the objects of different memory spaces, as will be described later.

Meanwhile, the case of extinguishing a pointer will now be described. In the case of extinguishing a pointer, for example, the access to the shared memory M by a user is ended. In this case of extinguishing a pointer, the processing differs between when the number-of-reference measuring object which is referred to by the extinguishing target pointer is referred to by another pointer and when that number-of-reference measuring object is not referred to by any other pointer.

Figure 21:
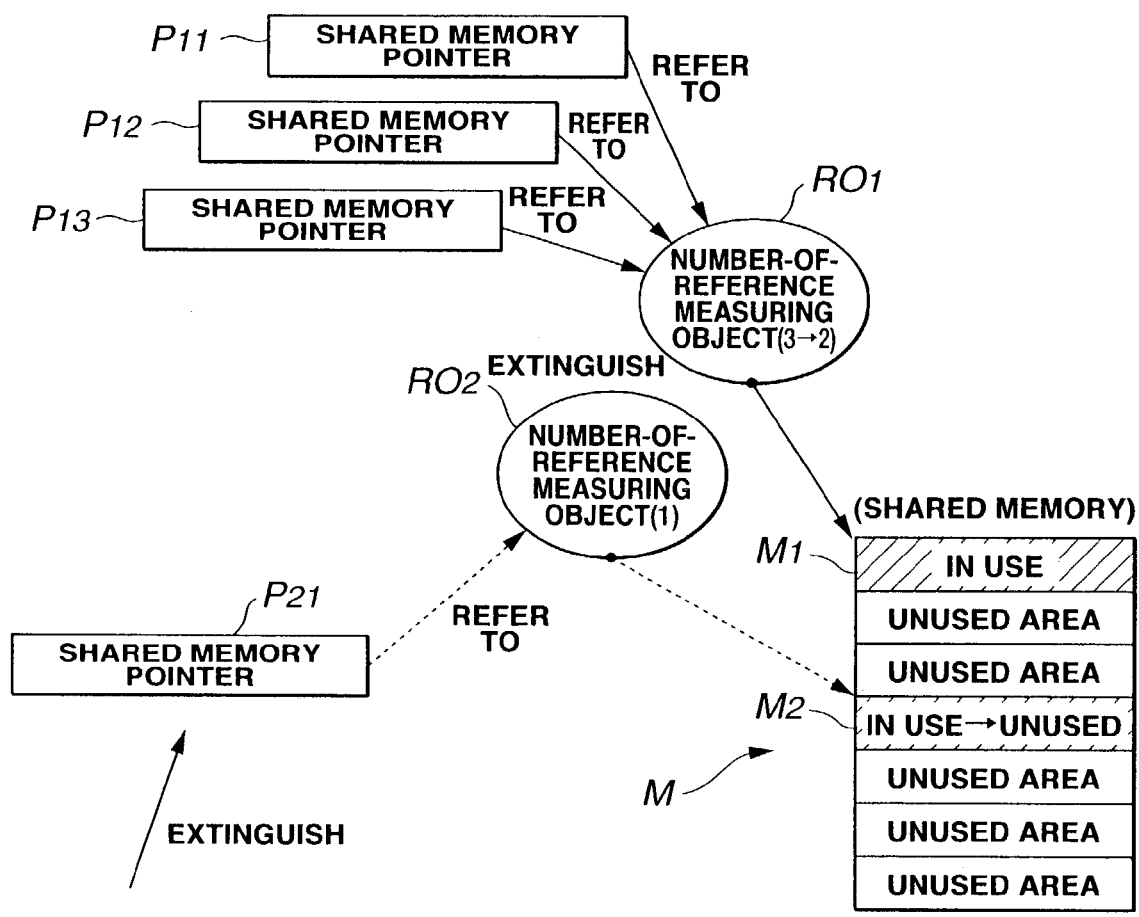
FIG. 21 is a view used for explaining the extinction of a pointer.

Specifically, as shown in FIG. 21, if a number-of-reference measuring object RO1 referred to by a pointer P11 which is to be extinguished is also referred to by other pointers P12 and P13, only the pointer P11 is extinguished. Then, the number of references measured by the number-of-reference measuring object RO1 is changed from three to two. Such a change in the number of references is equivalent to a change of the number-of-reference measuring object RO1.

On the other hand, if a number-of-reference measuring object RO2 is not referred to by any other pointer than a shared memory pointer P21 which is to be extinguished, that is, if the number of references measured by the number-of-reference measuring object RO2 is one, the pointer P21 which is to be extinguished and the number-of-reference measuring object RO2 which is referred to by the pointer P21 are extinguished. Thus, an area M2 which was indicated by the extinguished number-of-reference measuring object RO2 is returned to the system and is then considered to be an unused area. Meanwhile, in the above-described case where only the pointer P11 is extinguished, the area M1 indicated by the number-of-reference measuring object RO1 is still considered to be an area in use because the number of reference with respect to the area is not less than one.

In accordance with the processing (behaviors of pointers) as described above, if the number of references measured by the number-of-reference measuring object is not less than two, a plurality of users are using (i.e., referring to) a predetermined area on the shared memory corresponding to the number-of-reference measuring object, and if the number of references in the case of extinguishing a pointer (i.e., ending the reference) is not less than two, the number-of-reference measuring object is maintained, thus enabling protection of the use of (or reference to) the data by the other users. On the other hand, if the number of references measured by the number-of-reference measuring object is one, one user is using (i.e., referring to) a predetermined area on the shared memory corresponding to the number-of-reference measuring object, and the use of (or reference to) the data need not be secured for the other users. Therefore, by extinguishing the number-of-reference measuring object together with the pointer, the predetermined area can be changed to an unused area.

Figure 22:
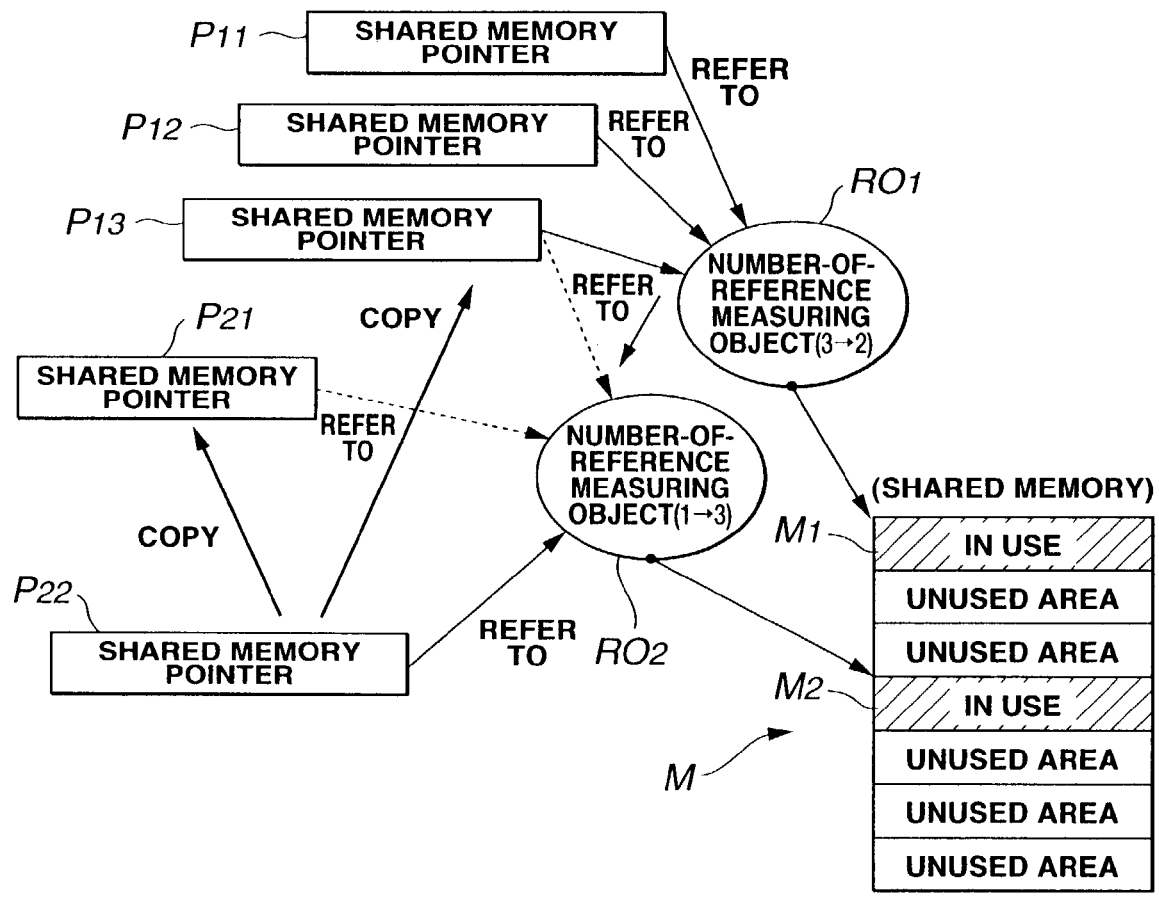
FIG. 22 is a view used for explaining the behavior of a pointer when copying data.

Referring to FIG. 22, the case of duplicating data will now be described. The duplication of data is achieved simply by changing the number-of-reference measuring object as the reference target (i.e., increasing or decreasing the number of references). Specifically, as shown in FIG. 22, when duplicating data in a second area M2, if the data is to be duplicated for a new user, a new pointer P21 which refers to a second number-of-reference measuring object RO2 indicating the second area M2 is generated. If the data is to be duplicated for a user who is accessing another area (for example, a first area M1), the target of reference by a pointer P13 of the user is changed to the second number-of-reference measuring object RO2 indicating the second area M2. Thus, in this example, the number of references measured by the first number-of-reference measuring object RO1 indicating the first area M1 is reduced from three to two, and the number of references measured by the second number-of-reference measuring object RO2 is increased from one to three.

Figure 23:
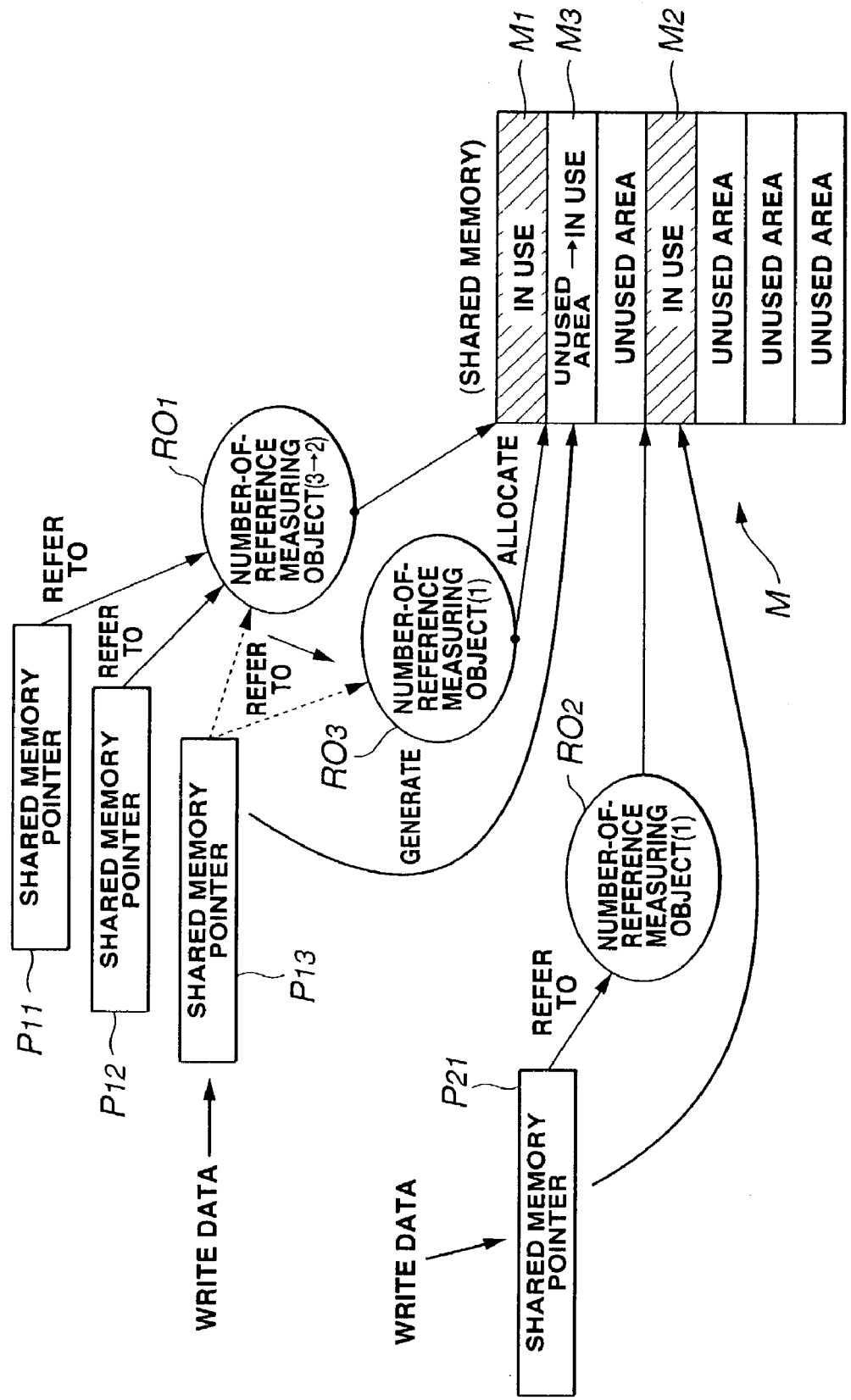
FIG. 23 is a view used for explaining the behavior of a pointer when rewriting data.

Referring to FIG. 23, the case of rewriting data recorded in a predetermined area on the shared memory will now be described. As shown in FIG. 23, if an area M2 in which data is to be rewritten is accessed only by the user (referrer) who is to rewrite the data, that is, if the number of references measured by a number-of-reference measuring object RO2 is one, free rewriting is permitted in the area M2 and therefore the data in the area M2 is directly rewritten.

On the other hand, if an area M1 in which data is to be rewritten is accessed by a plurality of users including the user who is to rewrite the data (that is, if the number of references measured by a number-of-reference measuring object RO1 is not less than two), rewriting the data will destroy the data for the other users and therefore an unused area M3 is allocated for rewriting. Specifically, the unused area M3 is allocated and rewriting of the data is carried out in accordance with the following processing procedure.

First, a new number-of-reference measuring object RO3 indicating (or allocated to) the unused area M3 is generated. Then, the target of reference by a pointer P13 of the user who is to be rewrite the data is changed to the newly generated number-of-reference measuring object RO3, and the data is newly written into the area M3 indicated by the number-of-reference measuring object RO3. In this case, the number of references measured by the newly generated number-of-reference measuring object RO3 is one and the number of references measured by the original number-of-reference measuring object RO1 is reduced (in this example, from three to two).

In accordance with such processing procedure, when the area in which one user is to rewrite the data is accessed by the other users, the data is written into the new area and the rewriting of data by the one user is realized without destroying the data accessed by the other users.

The generation of a number-of-reference measuring object and the change of a pointer to another number-of-reference measuring object as described above are automatically carried out by a system (control means) for monitoring the number of references measured by the number-of-reference measuring object. Therefore, the user who is to rewrite the data can rewrite the data, irrespective of the processing such as the generation of a number-of-reference measuring object and the change of a pointer to another number-of-reference measuring object (that is, without having to understand the processing).

Moreover, in rewriting the data, since the processing in the case where another user exists and the processing in the case where no other users exist are automatically carried out, the user who is to rewrite the data can rewrite the data without having to know which processing is carried out. As the rewriting of the data is realized without the user (object) having to understand the processing contents in rewriting the data, a program for executing such processing contents need not be incorporated in the object design.

The behavior of the pointer (reference management) for the generation, extinction and change (increase/decrease in the number of references measured) of the number-of-reference measuring object corresponding to the various processing is described above. The reference management carried out over memory spaces will now be described. Specifically, in this case, respective objects exist in different memory spaces and a shared memory is accessed by these objects (users).

Figure 24:
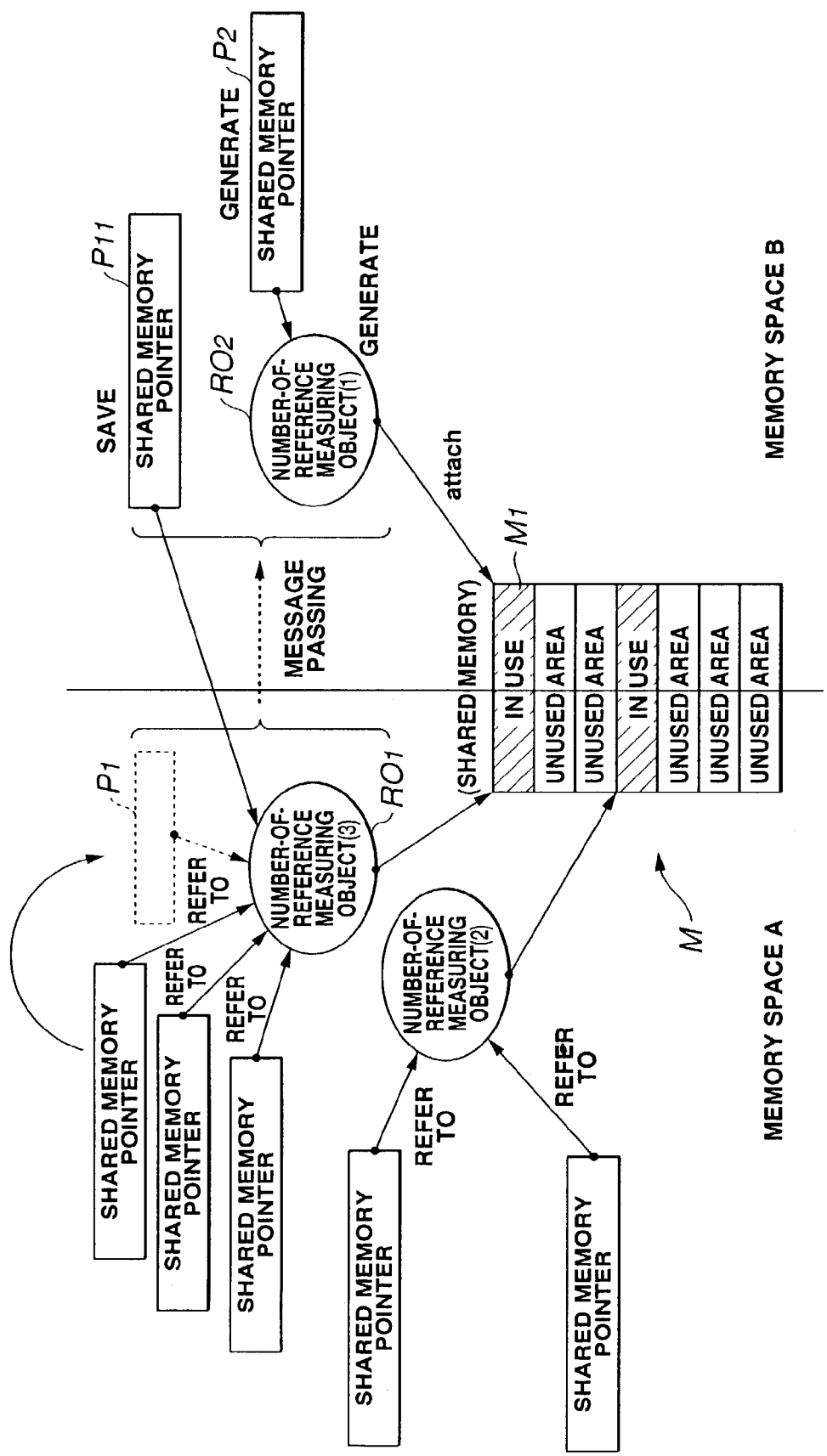
FIG. 24 is a view used for explaining the processing when starting inter-object communication between objects having different memory spaces.

First, the processing procedure in transferring data from an object A (memory space A) to an object B (memory space B) will be described with reference to FIG. 24.

A user acquires a pointer P1, and by using the pointer P1, the user writes data which the user wants to transmit, into an area corresponding to the pointer P1. In this case, the area corresponding to the pointer P1 is an area M1 indicated by a number-of-reference measuring object RO1 which the pointer P1 refers to. By doing so, the behavior of the pointer enables realization of secure writing of data.

Next, the pointer P1 acquired for transmitting this data is handed to a subject of the object B, which is a surrogate program (transmission agent). Having received the pointer P1, the subject prepares a duplicate of the pointer P1 and a notification of the duplicate is sent to the object B (i.e., message passing is carried out). In this case, for example, the notification of the duplicate is sent to the object B together with attribute data including the ID of the shared memory or the like. Such message passing between the so-called subject and observer is realized by using a Notify message from the subject as described above, and is realized by the function (message communication function) to send a message accessing the shared memory M between information processing processes constructed in different memory spaces. Since the duplicate of the pointer P1 is prepared by the subject, one is added to the number of references measured by the number-of-reference measuring object RO1 on the transmitting side. In this example, as shown in FIG. 24, the number of references measured by the number-of-reference measuring object RO1 is increased from three to four by the generation of the duplicate pointer P1.

On the other hand, the observer, as a surrogate program (reception agent) of the object B on the receiving side, receives the notification from the subject and stores a pointer P11. Moreover, on the basis of the ID of the shared memory or the like sent together with the pointer P11, the observer attaches to a memory M1 on the shared memory M indicated by the number-of-reference measuring object RO1 which the original pointer P1 of the pointer P11 refers to, from the memory space B side, by using a newly generated number-of-reference measuring object RO2. Then, the observer prepares a pointer P2 for referring to the area M1 on the memory space B side in response to a request from the user (object B), and sends the pointer P2 to a number-of-reference measuring object RO3. Thus, since the data in the area M1, which can be referred to by the object A, can also be referred to by the object B, the inter-object communication is practically realized between the object A and the object B in the different memory spaces.

In the memory space on the object A side, since the pointer is sent to and held by the object B and is counted as the number of references by the number-of-reference measuring object RO1, the access to the shared memory by the object A is carried out on the assumption that the shared memory is also accessed by the object B.

Figure 25:
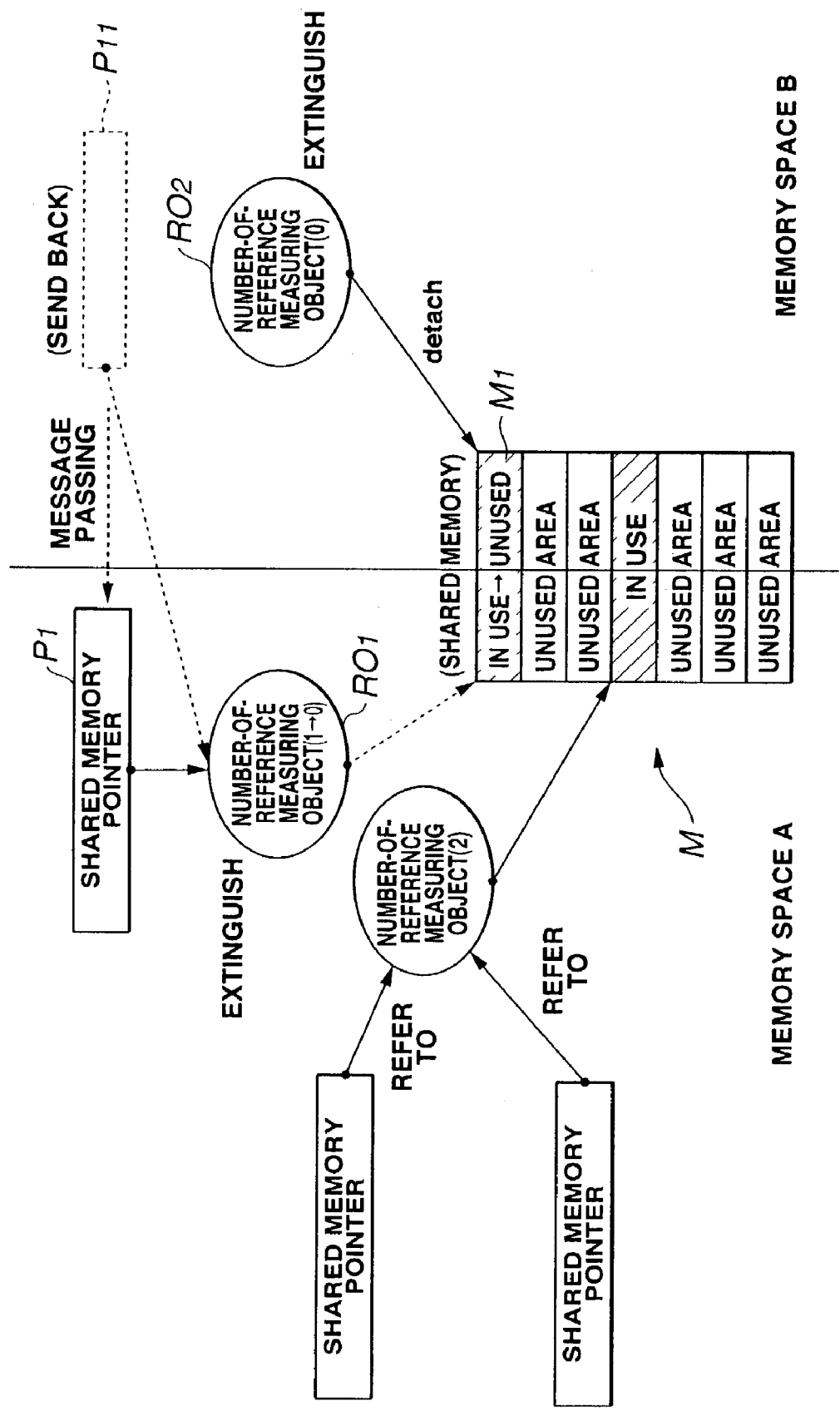
FIG. 25 is a view used for explaining the processing when ending inter-object communication between object having different memory spaces.

Referring to FIG. 25, the procedure for opening of data will now be described. The opening of data means opening of the shared state of the shared memory from the state where the object A and the object B exist in the different memory spaces, respectively (as described with reference to FIG. 24).

On completion of the processing at the object B, a Ready message for requesting the next data is sent to the object A. In this case, in the observer, the pointer P11 (pointer P2) received from the object A is sought and it is checked whether the number of references measured by the number-of-reference measuring object RO2 corresponding to the sought pointer P11 is zero or not. If the number of references is zero, it is determined that the use at the object B is ended and the pointer P11 is sent back to the object A (subject) (that is, message passing is carried out). At the subject of the object A, the corresponding pointer P1 is extinguished on the basis of the normal behavior (normal processing procedure). In this example, since the number of references measured by the corresponding number-of-reference measuring object RO1 is reduced from one to zero in response to the extinction of the pointer P1, the number-of-reference measuring object RO1 is extinguished.

Figure 26:
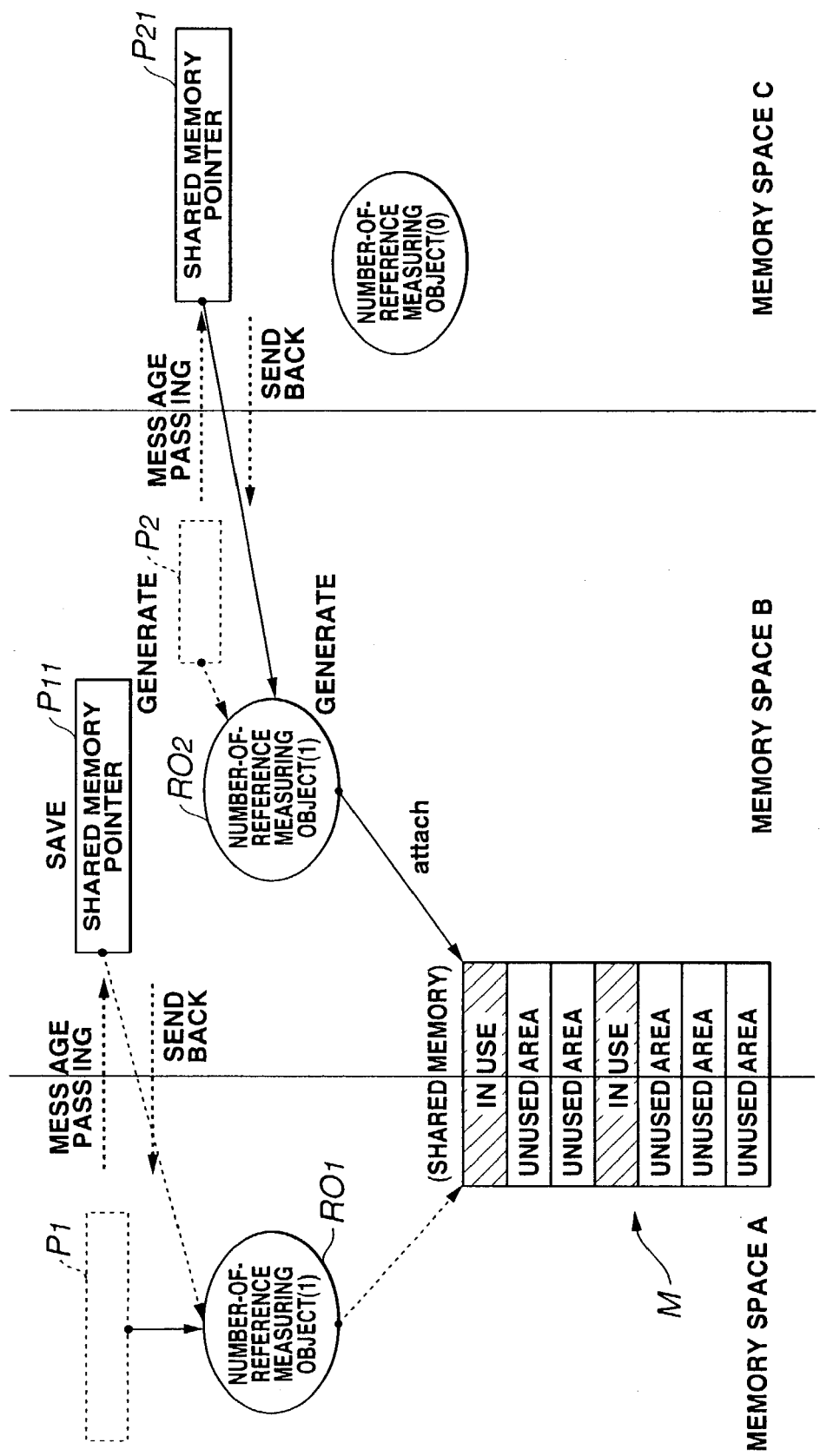
FIG. 26 is a view used for explaining the processing when subletting data to a third object.

The data transfer processing and the like between the objects (users) existing in the different memory spaces are described above with reference to FIGS. 24 and 25. Hereinafter, so-called subletting of data to a third object will be described, which is realized by applying the processing procedure as described above. The subletting of data to a third object applies to such a case that when a predetermined area M1 on the shared memory is shared by the objects A and B existing in different memory spaces, as shown in FIG. 24, further opening (sharing) of the data to a third object is made possible. The processing procedure for this so-called subletting of data to a third object can be basically achieved by combining the processing procedure of FIG. 24 (data transfer processing) and FIG. 25 (data opening processing). This processing procedure will now be described with reference to FIG. 26.

First, a user (object A (memory space A)) acquires a pointer P1, and by using the pointer P1, the user writes data which the user wants to send, into a corresponding area M1 on the shared memory M. Next, the pointer P1 acquired for sending this data is handed to a subject of the object A. Having received the pointer P1, the subject prepares duplicate of the pointer P1 and sends a notification of the duplicate to the object B (i.e., message passing is carried out). In this case, for example, the notification is sent to the object B together with attribute data including the ID of the shared memory.

An observer of the object B on the receiving side receives the notification from the subject and stores a pointer P11. Moreover, on the basis of the ID of the shared memory or the like sent together with the pointer P11, the observer attaches to the memory M1 on the shared memory M indicated by the number-of-reference measuring object RO1 which the original pointer P1 of the pointer P11 refers to, from the memory space B side, by using a newly generated number-of-reference measuring object RO2. Then, the observer prepares a pointer P2 for referring to this area on the memory space B side in response to a request from the user, and sends the pointer P2 to a number-of-reference measuring object RO3. The number of references measured by the number-of-reference measuring object RO1 is set to one. Thus, the result is equivalent to that the data in the area M1 is received by the user (object B).

The object B sends the pointer P2 to the subject. Having received the pointer P2, the subject prepares a duplicate of the pointer P2 and sends a notification of the duplicate to a third object C (memory space C) as a subletting counterpart (i.e., message passing is carried out). In this case, for example, the notification is sent to the object C together with attribute data including the ID of the shared memory. An observer of the object C on the receiving side receives the notification from the subject and stores a pointer P21. Through such processing, the number of references measured by the number-of-reference measuring object is propagated when the data sublet to the third object C. Therefore, the data in the area M1 is protected even when the data is sublet to the third object C.

When the use of the data (area) by the third object is ended, the processing to automatically send back the data (or open the data) is carried out. The data opening processing is carried out as follows.

On completion of the processing at the object C, a Ready messages for requesting the next data is sent to the object B. In this case, in the observer, the pointer P21 received from the object B is sought and it is checked whether the number of references measured by the corresponding number-of-reference measuring object RO3 is zero or not. If the number of references is zero, it is determined that the use at the object C is ended and the pointer P21 is sent back to the object B (that is, message passing is carried out). At the subject of the object B, the corresponding pointer P2 is extinguished on the basis of the normal behavior (normal processing procedure).

Moreover, a Ready message is sent from the object B (observer) to the object A. In this case, in the observer, the pointer P11 received from the object A is sought and it is checked whether the number of references measured by the corresponding number-of-reference measuring object RO2 is zero or not. If the number of references is zero, the pointer P11 is sent back to the object A (that is, message passing is carried out). At the subject of the object A, the corresponding pointer P1 is extinguished on the basis of the normal behavior (normal processing procedure).

In the above-described manner, the so-called data subletting processing to the third subject is carried out. Through the processing as described above, the number of references measured by the number-of-reference measuring object is propagated when the data sublet to the third object C. Therefore, the data in the area M1 is protected even when the data is sublet to the third object C.

According to the present invention, data can be sent from one object (subject) to a plurality of objects (observers) by using the pointers as described above. The case of sending data from an object A on the transmitting side to a plurality of objects B and C on the receiving side, as shown in FIG. 27, will now be described.

In the normal data transmission, if a user has not received a transmission enabling signal (Ready signal) from the receiving side when sending data to a subject which is a transmission surrogate program, the user cannot send the data. Therefore, in this case, the data is annulled or a retransmission request is issued while the data is held. The proceeding manner of the processing differs depending on the object on the receiving side. Therefore, if the user holds the data and waits until the reception is enabled, a transmission request must be issued to each transfer destination (object (observer)). Conventionally, such processing is carried out by the user who has the contents of the data.

According to the present invention, however, the data is written into the shared memory and processing (data management) is carried out within the subject. The specific processing procedure is taken as follows.

Figure 27:
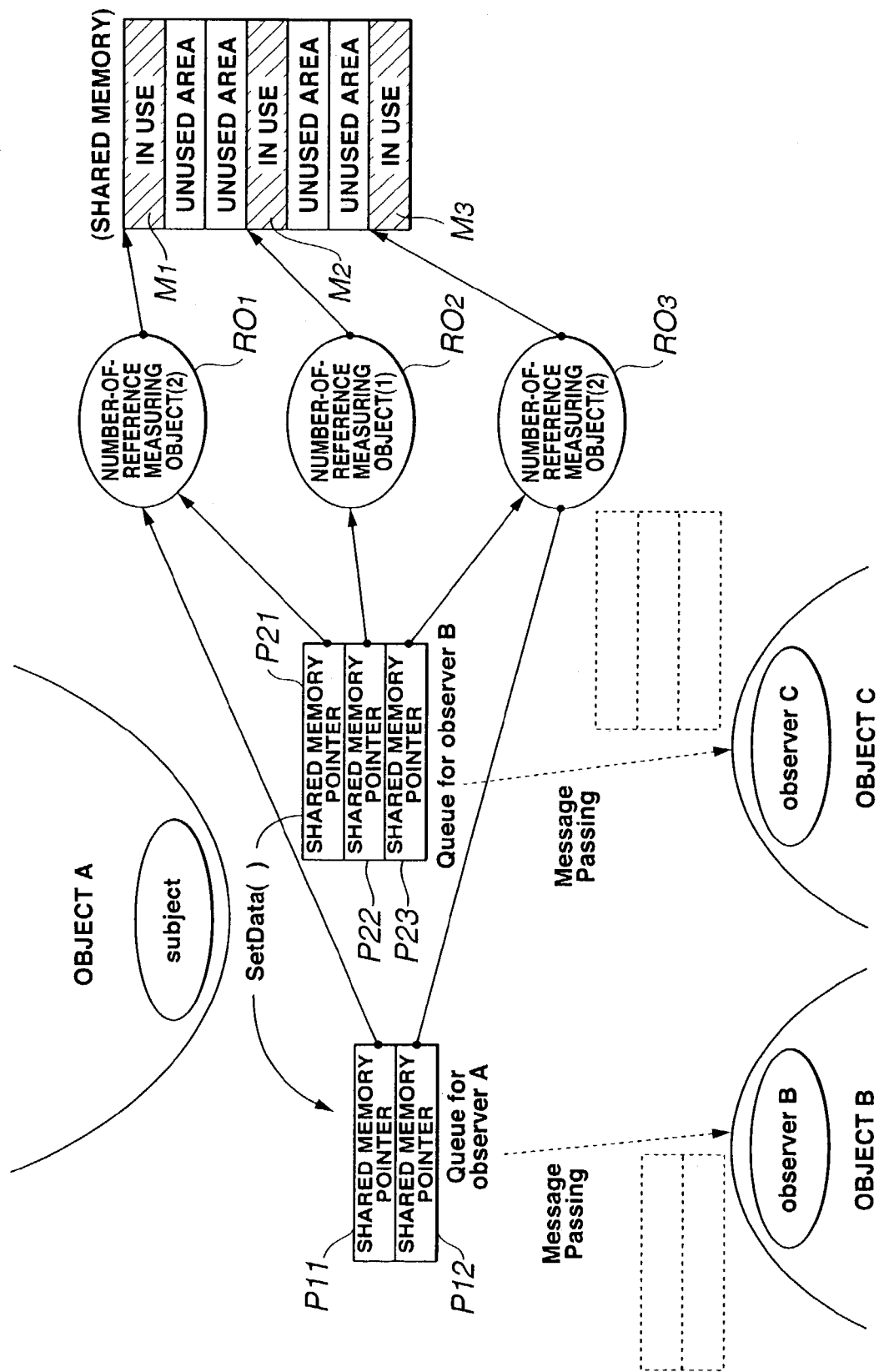
FIG. 27 is a view used for explaining the data transmission processing in the case where there are a plurality of objects on the transmitting side.

As shown in FIG. 27, the user writes data into predetermined area M1, M2, M3 on the shared memory M, and sends to a subject pointers P11, P12, P21, P22, P23 referring to the areas M1, M2, M3 in which data is written. On receiving the pointers P11, P12, P21, P22, P23, the subject first attempts to send data to observers of the objects B and C corresponding to the respective pointers P11, P12, P21, P22, P23. If reception is enabled on the receiving side (observer), the subject immediately sends the data. That is, a pointer is generated by the object on the receiving side and one is added to the number of references measured by the corresponding number-of-reference measuring object.

On the other hand, if reception is not enabled on the receiving side (observer), the subject enters a queue to every connection destination (receiving side). Then, when a Ready signal is received from the observer at which reception is enabled, the subject checks the queue from the observer which sent the Ready signal, and immediately sends data that is accumulated and should be sent to the object, if any.

Through the processing procedure as described above, the data transmission processing from one object (subject) to a plurality of objects (observers) is carried out.

According to the present invention, even when the same data is used, the quantity of the received data and the receiving timing (for example, processing cycle) can be varied in accordance with the application on the receiving side (object). An example of varying the receiving timing for image data at each object will now be described.

In the following case, for example, image data is distributed to each of image processing objects which have different image processing contents such as an object for carrying out motion detection image processing (hereinafter referred to as motion detection object) and an object for recognizing a face image (hereinafter referred to as face recognition object). The image data distribution processing in this case is carried out by using pointers as described above and will not be described further in detail.

For example, the motion detection object needs to receive one picture of image data once every two frames, while the face recognition object may receive one picture of image data once every 30 frames. However, to which object (motion detection object or the face recognition object) an image distribution object is connected at the time of designing is not considered. On the assumption of these conditions, the image distribution object sends image data to a subject (every frame subject) for every frame processing. The subject receives parameters related to the quantity and synchronization of data transmission from an observer which is connected at the time of start-up of the system or the like. The subject carries out subsequent transmission in accordance with such parameters. Specifically, with respect to the observer of the motion detection object, the subject enters a queue in the data every other time, thereby carrying out transmission every other time. For example, the image data of the frame during the period when transmission is not carried out is annulled without carrying out any particular processing. Similarly, with respect to the observer of the face recognition object, the subject enters a queue in the data sent from the user once every 30 times, thus carrying out transmission once every 30 times.

As described above, according to the present invention, even when the same data is used, the quantity of the received data and the receiving timing (for example, processing cycle) can be varied in accordance with the application on the receiving side (object). Since such processing is realized by the subject and the object which are surrogate programs, the object need not be designed on the assumption of such processing and the independence of the object can be secured.

The features of the present invention which are adapted as the embodiment are described above with reference to FIGS. 19 to 27. The present invention realizes smooth inter-object communication. Specifically, the following effects can be provided.

Since data transmission between objects is carried out by sharing data on a shared memory, the inter-object communication can be carried out at a high speed. Moreover, since data transmission between objects is carried out by sharing data on a shared memory, the time required for communication can be kept constant irrespective of the quantity of data.

By managing data using a pointer indicating data on a shared memory, the management of data is facilitated and data can be managed for every transmission destination. By managing data using a pointer indicating data on a shared memory, data can be distributed in a communication cycle (processing cycle) in response to a request from an object of transmission destination. Moreover, for every transmission destination, data which could not be acquired at a peak can be saved and collectively sent.

On the receiving side, since the data cycle is stable even when the load on the CPU is varied, highly reliable signal processing is made possible.

Since a reference management function is added to a pointer indicating a shared memory, that is, since a pointer is managed by an independent number-of-reference measuring object, data protection (data management) oil the shared memory can be carried out without making a user aware of it.

Moreover, since components associated with communication are mounted within a subject and an observer, that is, since processing associated with communication is executed only by a subject and an observer, the independence of a object having such subject and observer as software components is improved. Therefore, a communication counterpart in the inter-object communication can be dynamically changed.

As an operating system (OS) which realizes the processing as described above, Aperios provided by Sony Corporation may be considered. However, the OS is not limited to this and any general multi-process OS having the functions of message communication and shared memory may be employed.

In the above-described embodiment, inter-object communication as the essential part of the present invention is applied to a robot device. However, the present invention is not limited to this embodiment. For example, the present invention can also be applied to a device the operation of which is controlled by an object.

(2) Operation of Robot Device

The robot device 1 (FIG. 1)having the above-described structure takes the four-legged type form by attaching legs as the moving unit 3 to the body 2 and is driven by the motor attached to the legs so as to walk with the four legs. Alternatively, the robot device 1 takes the wheeled type form by attaching wheels instead of the rear legs and is movable via the wheels.

In the robot device 1 (FIG. 2), on the basis of the outputs of the sensors arranged on the legs and the like as the robot components 24, 25, 26 and the information acquired by various information acquiring means arranged on the head part 2A, a necessary control command is outputted through the processing at the central processing unit 22, thus controlling the moving unit 3 and the like.

In the robot device 1 (FIGS. 3 and 4), the upper-layer software of object-oriented structure drives the various devices on the device driver layer, thus executing control of these devices. In such control, in the robot system software, which is on the upper layer than the device driver layer, the virtual robot detects the components connected to the serial bus and notifies the design robot of the connection information (CPC connection information) indicating what robot component is connected in what order in the robot device 1 as a whole. Thus, in the robot device 1, the current form is specified in accordance with the device connected to the serial bus and the control target constituting the current form is specified.

In the robot device 1, the software on the upper layer than the robot system software is updated in accordance with the connection information (CPC connection information) and the overall operation is controlled by appropriate software suitable for the form.

In updating the software, the robot device 1 compares the design file described by appending a label to the group of constituent element information (CPC primitive location information) of the respective components for each form by the design robot of the robot system software, with the connection information (CPC connection information) notified of by the virtual robot, and selects an appropriate object suitable for the form, thus changing the form-dependent software based on this object (FIGS. 7 and 8). Thus, in the robot device 1, the appropriate software suitable for the form can be easily changed and the overall operation can be controlled.

Moreover, the upper-layer software is divided into the form-independent software which is independent of the form of the robot device and the form-dependent software which is dependent on the form, and only the form-dependent software is updated in the state where the data handled in a format independent of the form by the form-independent software is converted to a format corresponding to the form by the form-dependent software so as to be transmitted to and received from the robot system software. Thus, the software can be updated by simple processing.

In this case, the virtual robot generates the constituent element information (CPC primitive location information) using the description in a text data format (FIGS. 8 and 9) and the design file is described in a similar text data format. Therefore, it is easy to cope with the future increase of varying forms.

In the robot device 1, the updating of the software is carried out as the object manager reconstructs the objects of the form-dependent software. That is, the object manager is notified of the connection information (connection data) giving an instruction to connect an object suitable for the current form, by the design robot at the start-up or the like, and the object designated by the connection information (connection data) is loaded (FIG. 16).

After the loaded object is initialized, the object manager connects a subject and an observer that data can be exchanged between them, in accordance with the designation by the connection information (connection data). In the robot device 1, the form-dependent software is thus constructed by the object suitable for the form.

Therefore, in the robot device 1, each object can be designed and the software can be constructed without considering any specific connection target. By generating connection information (connection data) in accordance with the form, the software suitable for the form can be easily constructed. Moreover, the software can be changed without re-compiling or re-linking. Therefore, in the robot device 1, the independence of the object can be significantly improved, compared with the conventional technique, and accordingly, the appropriate software suitable for free changes of the form can be provided easily and quickly. The inter-object communication can also be constructed between one object and a plurality of objects by so setting the connection information.

Since the connection information (connection data) is the information specifying the format of data to be communicated with a subject, the object manager can specify the corresponding object ID and selector number in accordance with the connection information (connection data) and easily construct the inter-object communication.

Since the design robot selects and provides connection information from the design file having a plurality of pieces of connection information recorded therein to the object manager, it is possible to easily construct the software corresponding to various forms, when necessary, by so setting the design.

Moreover, since the connection information (connection data) is described in a text data format, it can be easily changed in various manners.

Meanwhile, when the form of the robot device 1 is changed, the virtual robot detects the change of the format and notifies the design robot of connection information (CPC connection information) relating to the changed form. The design robot compares this connection information (CPC connection information) with the design file and thus generates connection information (connection data) relating to the changed form. In accordance with the connection information (connection data), the object manager unloads an object which has become unnecessary because of the change of the form, and loads an object which has become necessary because of the change of the form, thus reconstructing the objects constituting the form dependent software. Moreover, these objects are connected to enable inter-object communication by The connection information (connection data) and the form-dependent software is thus updated.

Accordingly, in the robot device 1, while the form-independent software and the like are operating, the form-dependent software can be updated, when necessary, to construct the software suitable for the form. It is also possible to apply this change of the software to switching of the power consumption mode. Moreover, the present invention enables smooth inter-object communication and high-speed processing.

Figure 28:
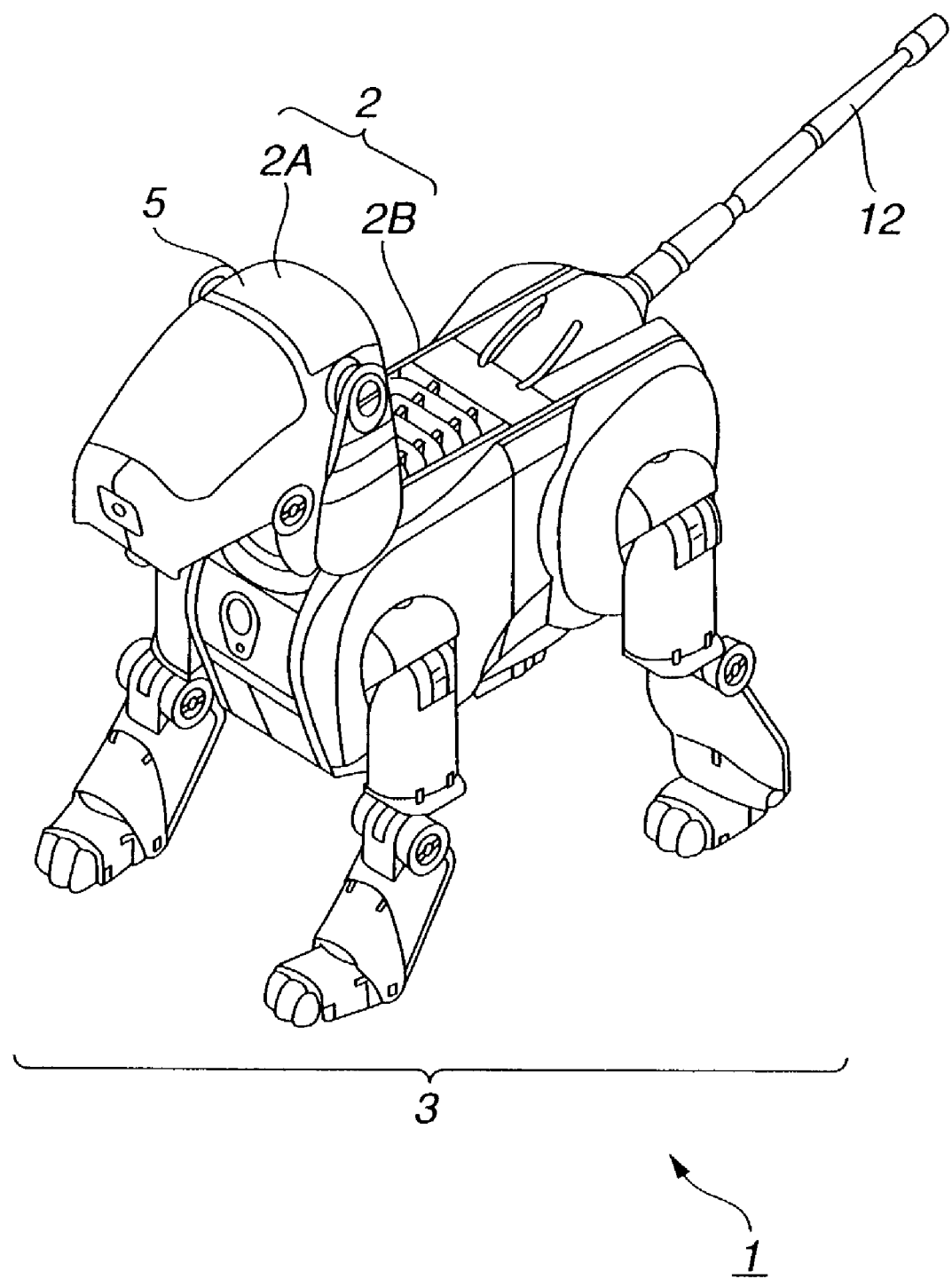
FIG. 28 is a view showing a more specific example of the robot device.

The robot device used as an embodiment of the present invention is not limited to a device having an appearance as shown in FIG. 1. For example, the robot device 1 may also have an appearance/shape which is more like that of a certain animal, as shown in FIG. 28. In the robot device 1 shown in FIG. 28, the parts corresponding to those in FIG. 1 are denoted by the same numerals.

The invention claimed is:

1. An information processing device comprising:
control means having a plurality of information processing processes and adapted for carrying out control processing based on inter-process communication carried out between the information processing processes, wherein the control means has a number-of-access measuring process for measuring a number of accesses and controls whether the number-of-access measuring process is extinguished based on the number of accesses measured by the number-of-access measuring process and access by the plurality of information processing processes to a shared memory shared by the plurality of information processing processes and thus carrying out inter-process communication.

2. The information processing device as claimed in claim 1, wherein the information processing processes are made up of programs prepared on the basis of an object-oriented system.

3. The information processing device as claimed in claim 1, wherein as the control means, in the inter-process communication, controls accesses by the plurality of information processing processes to data in the same area on the shared memory, the data is shared by the plurality of information processes.

4. The information processing device as claimed in claim 3, wherein as the control means, in the inter-process communication, automatically allocates the same area on the shared memory in which data is to be recorded, as a transmission buffer used for the inter-process communication.

5. The information processing device as claimed in claim 1, wherein the control means controls the accesses by the plurality of information processing processes to the shared memory by using a communication management process.

6. The information processing device as claimed in claim 1, wherein the control means transmits a message for accessing the shared memory by the information processing processes constituted in different memory spaces, and controls the accesses to the shared memory by the plurality of information processing processes on the basis of the message.

7. The information processing device as claimed in claim 1, wherein the control means generates pointers in accordance with the accesses to the shared memory by the information processing processes and controls the accesses to the shared memory by the plurality of information processing processes on the basis of the number of pointers as the number of accesses.

8. The information processing device as claimed in claim 7, wherein the number-of-access measuring process enables dynamic change of a communication counterpart in the inter-process communication, and
the control means controls the accesses to the shared memory by the plurality of information processing processes on the basis of the number of accesses measured by the number-of-access measuring process.

9. The information processing device as claimed in claim 1, wherein the plurality of information processing processes are constituted in different memory spaces, respectively, and
the accesses to the shared memory by the plurality of information processing processes are made over the different memory spaces.

10. The information processing device as claimed in claim 1, wherein the control means controls the access to the shared memory on the basis of the processing cycle of the information processing process on the receiving side.

11. The information processing device as claimed in claim 1, wherein the control means generates a queue for the access to the shared memory on the basis of the load on the information processing process on the receiving side, and controls the access to the shared memory in accordance with the queue.

12. An information processing method having a plurality of information processing processes and adapted for carrying out control processing based on inter-process communication carried out between the information processing processes, the information processing method comprising:
measuring a number of accesses;
controlling whether a number-of-access measuring process is extinguished based on the number of accesses measured by the number-of-access measuring process; and
controlling access by the plurality of information processing processes to a shared memory shared by the plurality of information processing processes and thus carrying out inter-process communication.

* * * * *